US010630601B2

(12) United States Patent
To et al.

(10) Patent No.: US 10,630,601 B2
(45) Date of Patent: *Apr. 21, 2020

(54) CONTROLLING FAIR BANDWIDTH ALLOCATION EFFICIENTLY

(71) Applicant: Microsoft Technology Licensing, LLC, Redmond, WA (US)

(72) Inventors: Khoa To, Redmond, WA (US); Jitendra Padhye, Redmond, WA (US); George Varghese, Cupertino, CA (US); Daniel Firestone, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/123,193

(22) Filed: Sep. 6, 2018

(65) Prior Publication Data
US 2019/0007338 A1 Jan. 3, 2019

Related U.S. Application Data

(63) Continuation of application No. 14/601,214, filed on Jan. 20, 2015, now Pat. No. 10,097,478.

(51) Int. Cl.
*H04L 12/911* (2013.01)
*H04L 12/877* (2013.01)
*H04L 12/873* (2013.01)
*H04L 12/863* (2013.01)

(52) U.S. Cl.
CPC .......... *H04L 47/783* (2013.01); *H04L 47/525* (2013.01); *H04L 47/528* (2013.01); *H04L 47/6265* (2013.01)

(58) Field of Classification Search
CPC . H04L 47/783; H04L 47/6265; H04L 47/528; H04L 47/525
See application file for complete search history.

(56) References Cited

U.S. PATENT DOCUMENTS

| | | | | |
|---|---|---|---|---|
| 6,747,976 | B1 * | 6/2004 | Bensaou | H04L 12/5601 370/395.4 |
| 7,606,154 | B1 * | 10/2009 | Lee | H04J 3/14 370/232 |
| 7,761,875 | B2 * | 7/2010 | Karamanolis | G06F 9/50 370/235 |
| 8,671,407 | B2 * | 3/2014 | Ballani | H04L 67/101 718/1 |
| 8,681,614 | B1 * | 3/2014 | McCanne | H04L 47/522 370/230 |

(Continued)

*Primary Examiner* — Chris Parry
*Assistant Examiner* — Steven C Nguyen
(74) *Attorney, Agent, or Firm* — Liang IP, PLLC

(57) ABSTRACT

Micro-schedulers control bandwidth allocation for clients, each client subscribing to a respective predefined portion of bandwidth of an outgoing communication link. A macro-scheduler controls the micro-schedulers, by allocating the respective subscribed portion of bandwidth associated with each respective client that is active, by a predefined first deadline, with residual bandwidth that is unused by the respective clients being shared proportionately among respective active clients by a predefined second deadline, while minimizing coordination among micro-schedulers by the macro-scheduler periodically adjusting respective bandwidth allocations to each micro-scheduler.

20 Claims, 22 Drawing Sheets

(56) References Cited

U.S. PATENT DOCUMENTS

| | | | | |
|---|---|---|---|---|
| 2003/0179774 A1* | 9/2003 | Saidi | ............ | H04L 47/522 370/468 |
| 2011/0292792 A1* | 12/2011 | Zuo | ............ | H04L 47/20 370/230 |
| 2012/0127857 A1* | 5/2012 | Sundar | ............ | H04L 45/00 370/230.1 |
| 2013/0003543 A1* | 1/2013 | Ludwig | ............ | H04L 47/78 370/230 |
| 2013/0254375 A1* | 9/2013 | Agiwal | ............ | H04L 43/0882 709/224 |
| 2015/0282136 A1* | 10/2015 | Wenham | ............ | H04W 28/16 370/329 |

\* cited by examiner

```
//
// MG: Min Guarantee (what the VM is entitled to (e.g., paid for))
// SR: Send rate as measured since the last macro-scheduler iteration
// TR: The computed Target Rate for this iteration.
//      This is the max-cap value it is desired to give to this VM if the link has enough residual bandwidth
// AR: Current allocated rate (The allocated max-cap queue rate by the macro-scheduler in the previous iteration)
// RUStage: Ramp-up counter to track how much additional bandwidth to allocate to a VM.
// TempRate
//
residualBandwidth = lineRate;
totalNeedsMoreWeight = 0;
```
⎫ 410

412 — // Allocate bandwidth to all VMs, based on their recent send rates.

for each VM in VMList

414 — if (VM.AR == Disabled)

VM.TR = 1.1 * VM.SR

416 — else if (VM.SR < 85% of VM.AR for the last 1s)  // VM doesn't use all allocated bandwidth VM.TR = 1.1 * VM.SR;
VM.RUStage = Max(0, VM.RUStage -1)  // Reduce RUStage each time VM doesn't use all the allocated BW 418 — else if VM.SR > 0.95 * VM.AR  // VM wants more than allocated bandwidth 420 — VM.RUStage = Min(3, VM.RUStage + 1)  // Increase RUStage each time VM wants more BW

FIG. 4C

```
// The higher the value of RUStage, the more BW is given to the VM switch (VM.RUStage)

case 1: VM.TR = Min (VM.AR * 1.2, VM.AR + 0.1 * lineRate)
        // Give the VM 20% more BW, but not exceeding 10% of link speed case 2: VM.TR = Min (VM.AR * 1.5, VM.AR + 0.1 * lineRate)
        // Give the VM 50% more BW, but not exceeding 10% of link speed case 3: VM.TR = Max (VM.AR * 2, VM.MG)
        // Give the VM 100% more BW else // The VM is neither using too much nor too little of its allocated bandwidth
        VM.TR = VM.AR
        VM.RUStage = Max(0, VM.RUStage -1)

// If the VM doesn't send any traffic, give it some small max-cap value

VM.TR = Max(VM.TR, 10Mbps)
```

FIG. 4D

```
// TempRate is used to distribute remaining bandwidth.
// TempRate is set to the above computed TR, but not to exceed what the VM is entitled to VM.TempRate = Min(VM.TR, VM.MG)

if (VM.TempRate == VM.MG)
    VM.NeedsMore = true;
    totalNeedsMoreWeight = totalNeedsMoreWeight + VM.MG;
else
    VM.NeedsMore = false;

// Reduce the residualBandwidth by the amount currently being allocated for this VM residualBandwidth = Max(0, residualBandwidth – VM.TempRate)

end // of for loop.
```

438 —
```
//
// Distribute remaining bandwidth for VM with VM.NeedsMore = TRUE
//
While (residualBandwidth > 0 AND there are VMs that NeedsMore)
    for each VM in VMList
        if (VM.NeedsMore == true)
```

440 —
```
            // Give this VM its fair share of the residual bandwidth
            //
            VM.FairShare = residualBandwidth * VM.MG / totalNeedsMoreWeight
            VM.TempRate = VM.TempRate + VM.FairShare
```

442 —
```
            // This VM does not need more BW if its TempRate exceeds the
            // computed Target Rate (TR) value
            if (VM.TempRate >= VM.TR)
                residualBandwidth += (VM.TempRate – VM.TR)
                VM.TempRate = VM.TR
                VM.NeedsMore = false
        End // of for loop
End // of while loop
```

444 —
```
// All done with the allocation, now set AR for each VM to be the TempRate
// Now apply the final allocation values to the VMs
For each VM in VMList
    VM.AR = VM.TempRate
```

| Control, by each of the micro-schedulers, bandwidth allocation for respective virtual machines (VMs) of the respective clients, each of the respective clients subscribing to the respective predefined portion of bandwidth for use by the respective VMs, wherein the respective VMs of the respective clients are hosted on a cloud server, wherein the outgoing communication link includes an outgoing network communication link associated with one or more network interface cards (NICs) located on the cloud server | 616 |

(6c)

↓

| Control, by each of the micro-schedulers, bandwidth allocation for respective applications of the respective clients, each of the respective clients subscribing to the respective predefined portion of bandwidth for use by the respective applications, wherein the respective applications of the respective clients are hosted on a cloud server, wherein the outgoing communication link includes an outgoing network communication link associated with one or more network interface cards (NICs) located on the cloud server | 618 |

(6d)

↓

| Control, by the macro-scheduler, the micro-schedulers, providing an approximation of fair queuing, without using a feedback loop between the macro-scheduler and a transmitter | 620 |

(6e)

↓

| Control, by the macro-scheduler, the micro-schedulers, providing no bandwidth allocation controls when it is determined that the outgoing network communication link is not congested | 622 |

CONTROLLING FAIR BANDWIDTH ALLOCATION EFFICIENTLY

CROSS-REFERENCE TO RELATED APPLICATION(S)

This application is a continuation of and claims priority to U.S. patent application Ser. No. 14/601,214, filed on Jan. 20, 2015, the disclosure of which is incorporated herein in its entirety.

BACKGROUND

Devices (e.g., publicly available servers such as public clouds) provide server resources (e.g., applications, virtual machines, execution entities, etc.) to users, and may allocate bandwidth for such server resources. For example, a user of a particular resource may have a predefined entitlement to a predefined amount (or portion) of such bandwidth.

SUMMARY

According to one general aspect, a system may include micro-schedulers that control bandwidth allocation for clients, each client subscribing to a respective predefined portion of bandwidth of an outgoing communication link. A macro-scheduler controls the micro-schedulers, by allocating the respective subscribed portion of bandwidth associated with each respective client that is active, by a predefined first deadline, with residual bandwidth that is unused by the respective clients being shared proportionately among respective active clients by a predefined second deadline, while minimizing coordination among micro-schedulers by the macro-scheduler periodically adjusting respective bandwidth allocations to each micro-scheduler.

According to another aspect, bandwidth allocation is controlled, by a macro-controller, for users of respective resources that are respectively configured to transmit to a common outgoing communication link having a predefined maximum outgoing transmission bandwidth. Each of the respective users subscribes to a respective predefined portion of the outgoing transmission bandwidth of the outgoing communication link. Controlling the bandwidth allocation includes determining a periodic bit rate of outgoing transmissions at the outgoing communication link, for a first predetermined temporal interval, and determining whether the outgoing communication link is currently congested, by comparing the periodic bit rate of outgoing transmissions at the outgoing communication link with a predefined rate of congestion value. If the outgoing communication link is determined as being currently congested, a respective independent max-cap queue is assigned to each of the plurality of respective users of the plurality of respective resources that are currently active, and a respective amount is allocated up to the respective subscribed portion of bandwidth associated with the each respective client that is active, by a predefined first deadline, with residual bandwidth that is unused by the respective clients being shared proportionately among respective active clients by a predefined second deadline. Respective bandwidth allocations to each of the plurality of respective users of the plurality of respective resources are periodically adjusted, to provide an approximation of fair queuing.

According to another aspect, a computer program product includes a computer-readable storage medium storing executable instructions that cause at least one computing device to control bandwidth allocation for execution entities that are respectively configured to transmit to a common outgoing communication link having a predefined maximum outgoing transmission bandwidth. Each of the respective execution entities subscribes to a respective predefined portion of the outgoing transmission bandwidth of the outgoing communication link. Controlling the bandwidth allocation includes controlling a plurality of micro-schedulers, each of the micro-schedulers controlling bandwidth allocation for the respective execution entities. Controlling the plurality of micro-schedulers includes, for each respective execution entity that is active, allocating the respective subscribed portion of bandwidth associated with the each respective execution entity that is active, by a predefined first deadline, with residual bandwidth that is unused by the respective execution entities being shared proportionately among respective active execution entities by a predefined second deadline, while minimizing coordination among micro-schedulers by periodically adjusting respective bandwidth allocations to each micro-scheduler.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 4A-4F illustrate example instructions for an example implementation of example operations of the system of FIG. 1.

FIGS. 6A-6D are a flowchart illustrating example operations of the system of FIG. 1.

DETAILED DESCRIPTION

I. Introduction

Figure 1A:
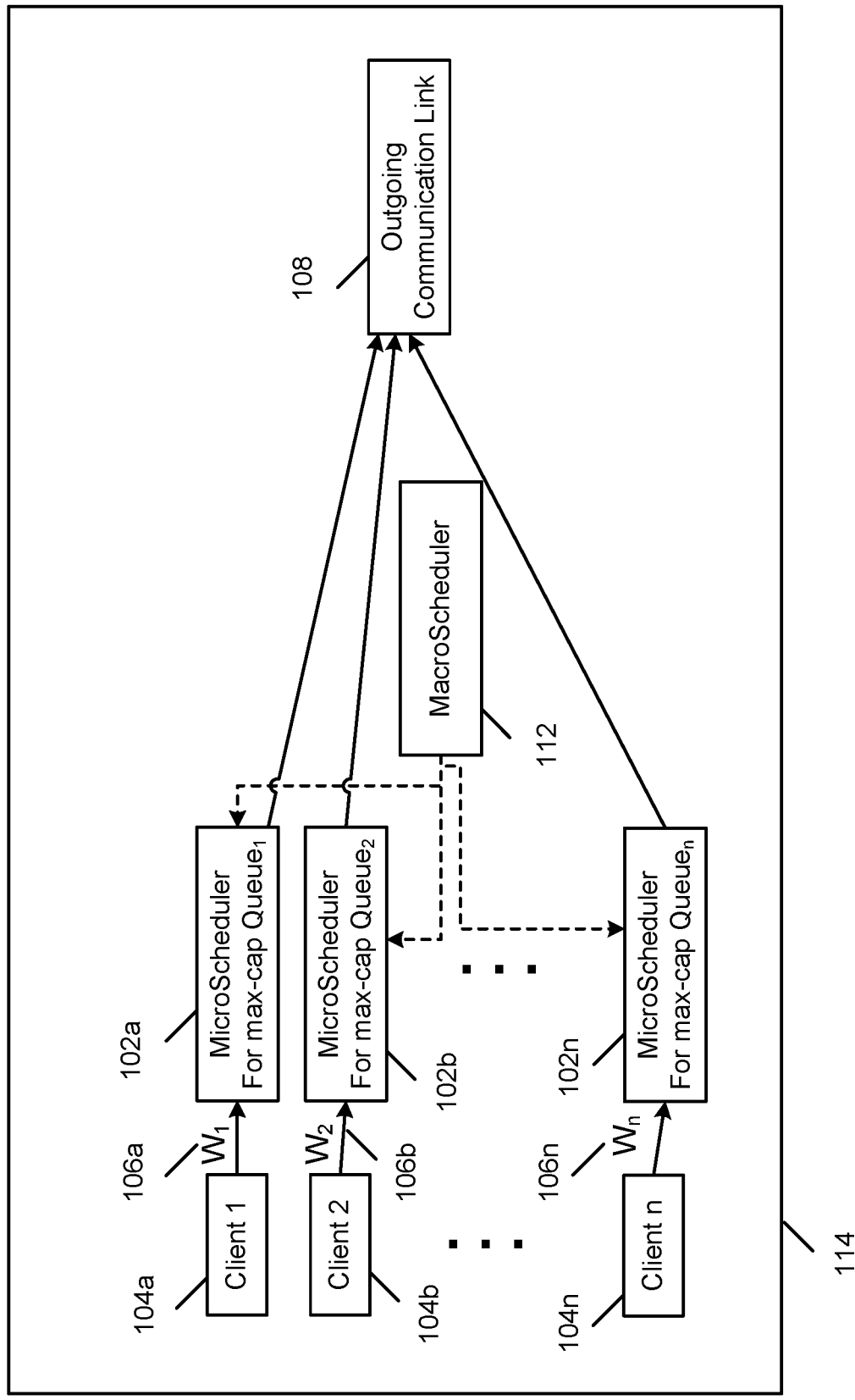
FIG. 1A is a block diagram of an example system for controlling fair bandwidth allocation, in accordance with example techniques discussed herein.

Devices provide resources to users, and may allocate bandwidth for such resources (e.g., data communication bandwidth). For example, a user of a particular resource may have a predefined entitlement to a predefined amount (or portion) of such bandwidth. For example, publicly available servers (e.g., public clouds) provide server resources to users, and may allocate virtual machines (VMs) to such users, as well as allocating bandwidth for each VM. For example, a user of a VM may have entitlement to a predefined amount (or portion) of such bandwidth. For example, the user may have a subscription that entitles the user to predefined amounts of resources (e.g., the bandwidth).

In this context, "cloud" may refer to a variety of computing concepts that involve one or more devices or computers that may be connected through a communication network such as the Internet. For example, "cloud computing" may refer to distributed computing over a network, and may involve an ability to run a program or application on multiple connected computers. One skilled in the art of computing will appreciate that example techniques discussed herein may use a "cloud" or any other remote device (e.g., a remote server, or simpler types of remote devices), without departing from the spirit of the discussion herein.

In this context, a "virtual machine" (VM) may refer to an emulation of a particular computer system. For example, virtual machines may operate based on the computer architecture and functions of a real or hypothetical computer, and their implementations may involve specialized hardware, software, or a combination of both. In this context, "bandwidth" may refer to a measurement of bit-rate of available or consumed data communication resources.

Public clouds such as AZURE and AMAZON's EC2 do not just allocate Virtual Machines (VMs), but also bandwidth for each VM based on user entitlement (e.g., entitlement via user/customer subscription/agreement/payment). Thus, a provider may need to control bandwidth allocation at a server among user VMs according to the respective amounts of bandwidth to which each user is entitled (e.g., via subscription). While each user can be allocated a fixed amount of bandwidth to which they are entitled, this may be wasteful because many users may not use their bandwidth entitlement amount for long periods of time. In accordance with example techniques discussed herein, this unused (residual) bandwidth can be proportionately redistributed among other non-idle (i.e., active) user VMs. Fair bandwidth allocation or fair queuing techniques may be used in many situations to handle similar issues; however, VMs involve several characteristics that may involve handling different from that of conventional techniques.

In this context, "fair bandwidth allocation" in Internet gateways refers to a problem of determining how to control allocation of network capacity between users that share an Internet connection. In this context, "fair queuing" refers to scheduling techniques used by process and network schedulers, e.g., to allow multiple packet flows to fairly share the link capacity. For example, in contrast with conventional first in first out (FIFO) queuing, with fair queuing, a high-data-rate flow (e.g., involving large or many data packets) cannot take more than its fair share of the link capacity.

For example, conventional fair queuing techniques may assume there is a tight feedback loop between transmission on the link and the scheduler implementing the allocation (e.g., in routers). However, this assumption is false in Virtual Switches where the scheduler may be implemented in software while transmission is performed by a hardware Network Interface card (NIC). Crossing the boundary between software and hardware may be expensive, particularly at Gigabit speed; optimizations such as Large Send Offload and Interrupt batching attempt to reduce the communication between software and hardware to once for a large batch of packets, and thus, direct simulation of existing fair queueing algorithms (e.g., Deficit Round Robin) may exhibit inefficient performance.

In accordance with example techniques discussed herein, the bandwidth of each respective VM may be controlled independently based on the amount of bandwidth the VMs have been measured to send in the last (prior) scheduling period (e.g., immediately prior in time to a current scheduling period, or scheduling interval), of a plurality of scheduling periods corresponding to a plurality of temporal intervals associated with such scheduling. For example, such techniques may advantageously alleviate a need for a feedback loop between software and the physical NIC. Thus, such techniques may be simple, efficient, and agnostic to the implementation details of various different physical NICs.

Example techniques discussed herein may converge to fair allocations over a small number of scheduling intervals, and may minimize wasted bandwidth due to VMs that do not fully utilize their allocations.

Example techniques discussed herein are based only on local observations of transmissions (and not on an entire network—thus, there is no requirement of coordination with remote endpoints). Further, example techniques discussed herein may control traffic aggregation at the virtual port level and are agnostic to layer-3 and layer-4 protocols and traffic patterns (e.g., of Transmission Control Protocol (TCP)).

Example techniques discussed herein may advantageously provide approximations of fair bandwidth allocation with independent queues.

Example techniques discussed herein may advantageously provide fair queuing without a feedback loop between schedulers and transmitters (e.g., which may be advantageous when a scheduler is implemented via software and the transmitter is implemented via hardware).

Example techniques discussed herein may advantageously provide a control technique that converges to fair allocation of bandwidth over an advantageously small number of scheduling periods based on the amount actually transmitted by a VM's per flow queue, compared to the bandwidth the VM was allocated.

Example techniques discussed herein may advantageously provide parameters that control tradeoffs between convergence time to the amount of bandwidth to which a VM is entitled (e.g., subscribed) and the link utilization, as well as the burstiness of the bandwidth allocated to a VM.

Further, example techniques discussed herein may advantageously provide a mode in which no controls are applied (hence reducing software overhead) that optimizes for the expected case when there is no congestion on the link.

Example techniques discussed herein may advantageously provide minimal shared state among the different VMs, which may in turn minimize locking overhead.

In accordance with one example implementation, a module implemented using software may track utilization of the NIC by counting packets that pass through a network Quality of Service (QoS) module (e.g., counting the packets via a counter), and may periodically compute the bit rate of the packets based on this counter. For example, the bit rate may be periodically determined in accordance with a plurality of temporal intervals (or time periods). For example, such temporal intervals may be set at a predetermined value (e.g., 100 milliseconds (ms)).

If the NIC is not congested, nothing is done to further control bandwidth allocations (e.g., no queue has a cap). For example, NIC "congestion" may be determined in accordance with a comparison of the determined bit rate, for a particular temporal interval, against a predetermined threshold value of congestion.

If the NIC is congested, a max-cap queue is assigned to each VM, and the max-cap values of these queues are actively adjusted every temporal interval (e.g., every 100 ms) to balance between bandwidth requirements and fair bandwidth allocations (i.e., amount of bandwidth each VM wants/requests vs. amount of bandwidth each VM is entitled/subscribed to receive) by the macro-scheduler. Each max-cap queue is managed by a micro-scheduler, independently of other micro-schedulers. The micro-scheduler associated with each max-cap queue enforces the respective max-cap value by scheduling packets through that queue so as to not exceed the max-cap value set by the macro-scheduler.

If a VM has sent below its allocated rate in the last temporal interval (e.g., 100 ms), its max-cap value is reduced.

The residual bandwidth (bandwidth left over from VMs that do not use all their min guarantees) is used to distribute to VMs that want to send more, as discussed below.

If a VM has sent substantially close to its allocated rate in the last 100 ms, its max-cap value is increased proportional to its fair bandwidth allocation.

For example, by controlling the rate out of each VM and distributing only the residual bandwidth to VMs that need more bandwidth, it may be ensured that the sum of the max cap values is less than or equal to the NIC's effective capacity. Thus, QoS controls distribution of the NIC's capacity across VMs.

In accordance with example techniques discussed herein, each max cap queue may be adjusted to increase or reclaim its allocated bandwidth.

For example, any VM that needs bandwidth may be given at least its guaranteed bandwidth within a time that is specified by a configurable parameter (e.g., within 400 ms). Thus, bandwidth may be shared among clients such that every active client is eventually allocated its subscribed bandwidth (e.g., its entitlement amount of bandwidth).

For example, any unused bandwidth may be reclaimed within a time that is specified by a configurable setting (e.g., within 1000 ms) which can be tuned (e.g., depending on the burstiness of the traffic, and whether it is desired to reclaim residual bandwidth between bursts).

FIG. 1A is a block diagram of an example system for controlling fair bandwidth allocation, in accordance with example techniques discussed herein.

As shown in FIG. 1A, outgoing communication link 108 on server 114 has a fixed amount of bandwidth (BW) available for outgoing communications from resources on server 114. As shown in FIG. 1A, a Client 1 (104a) is subscribed (entitled) to a subscribed amount of bandwidth (e.g., a client may subscribe, and pay a service provider for 100 MB/month of outgoing bandwidth on the server 114—for example, the client may pay $100/mo for 100 MB of outgoing bandwidth on the server 114), denoted by $W_1$ 106a. As shown in FIG. 1A, a Client 2 (104b) is subscribed (entitled) to another amount of bandwidth), denoted by $W_2$ 106b. Similarly, a Client n (104n) is subscribed (entitled) to another amount of bandwidth), denoted by $W_n$ 106n. Thus, the outgoing communication link 108 has sufficient bandwidth to support the subscribed bandwidth of the server's clients 104a, . . . , 104n. Further, the clients may all expect that they will each be able to get their subscribed outgoing bandwidth if they all become active and send outgoing information to the NIC 108 (i.e., each client will be able to get what they pay for). Example techniques discussed herein may control allocation of bandwidth so that all active subscribed clients will eventually receive (i.e., be allocated) the amount of outgoing bandwidth they subscribe to (and pay for). Further, example techniques discussed herein may control allocation of bandwidth so that residual bandwidth (left over after active clients have received their requested bandwidth, up to their subscribed amount) is allocated so that it is not unused (and wasted). Further, example techniques discussed herein may control allocation of bandwidth so that residual bandwidth (left over after active clients have received their requested bandwidth, up to their subscribed amount) is allocated proportionately to each active client's subscribed/entitled amount of bandwidth. Thus, clients are unable to conspire to obtain more bandwidth (e.g., the clients are treated as being untrusted).

For example, the clients 104a, . . . , 104n may be hosted on a single machine 114, and a host partition may include an operating system (OS) of the machine 114 to host the clients 104a, . . . , 104n, and may include a virtual switch (software) that acts like a switch with virtual ports to which the clients 104a, . . . , 104n are attached. The virtual switch includes functionality to ensure that the sum of the BW allocated across all the clients 104a, . . . , 104n is less than (or equal to) the output sum, and that the bandwidth is distributed among them proportionately to the respective client subscribed bandwidths.

As used herein, "client" may refer to a user, applications, virtual machines, or any type of execution entities that may use (or subscribe to, or be otherwise entitled to) outgoing bandwidth on a machine or device (e.g., a service provider server).

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

As further discussed herein, FIG. 1A is a block diagram of a generalized system 100A for efficient bandwidth allocation. The generalized system 100A as shown is merely intended to illustrate various example functionality and/or logic that may be included in example techniques as discussed herein, and is not intended to be limiting in terms of implementations in various hardware and/or software configurations. One skilled in the art of computing will appreciate that system 100A may be realized in hardware implementations, software implementations, or combinations thereof. As shown in FIG. 1A, a system 100A may include a device 114 (e.g., a hardware device) that includes at least one processor. The device 114 may include a computer-readable storage medium that stores executable instructions that are executable by the at least one processor, the executable instructions including a bandwidth allocation controller that includes a plurality of micro-schedulers 102a, 102b, . . . , 102n, each of the micro-schedulers controlling bandwidth allocation for respective clients 104a, 104b, . . . , 104n, each of the respective clients subscribing to a respective predefined portion of bandwidth of an outgoing communication link 108.

A macro-scheduler 112 controls the plurality of micro-schedulers 102a, 102b, . . . , 102n. For example, for each respective client 104a, 104b, . . . , 104n that is active, the macro-scheduler 112 allocates the respective subscribed portion of bandwidth associated with the each respective client 104a, 104b, . . . , 104n that is active, by a predefined first deadline, with residual bandwidth that is unused by the respective clients being shared proportionately among respective active clients 104a, 104b, . . . , 104n by a predefined second deadline, while minimizing coordination among micro-schedulers 102a, 102b, . . . , 102n by the macro-scheduler 112 periodically adjusting respective bandwidth allocations to each micro-scheduler 102a, 102b, . . . , 102n.

For example, the macro-scheduler 112 periodically adjusts the respective bandwidth allocations to each micro-scheduler 102a, 102b, . . . , 102n by accessing measurements of respective amounts of bandwidth used by each respective active client 104a, 104b, . . . , 104n in a predetermined temporal interval that is prior in time to a current temporal interval associated with a current periodic adjustment.

For example, the macro-scheduler 112 periodically adjusts the respective bandwidth allocations to each micro-scheduler 102a, 102b, . . . , 102n by capping respective bandwidth allocations at respective values of the respective subscribed portions of bandwidth for respective clients 104a, 104b, . . . , 104n that transmitted in respective amounts greater than the respective subscribed portions of bandwidth for the respective clients 104a, 104b, . . . , 104n, in the predetermined temporal interval that is prior in time to the current temporal interval associated with the current periodic adjustment.

For example, the macro-scheduler 112 periodically adjusts the respective bandwidth allocations to each micro-scheduler 102a, 102b, . . . , 102n by capping respective bandwidth allocations at respective values of respective current actual transmission amounts of bandwidth for respective clients 104a, 104b, . . . , 104n that transmitted in respective amounts substantially less than the respective subscribed portions of bandwidth for respective clients, in the predetermined temporal interval that is prior in time to the current temporal interval associated with the current periodic adjustment.

For example, the macro-scheduler 112 periodically adjusts the respective bandwidth allocations to each micro-scheduler 102a, 102b, . . . , 102n by determining the residual bandwidth that is unused by the respective clients 104a, 104b, . . . , 104n, after lowering one or more respective bandwidth allocations by capping the one or more respective bandwidth allocations based on actual transmission amounts, and proportionately allocating residual bandwidth that is unused by the respective clients 104a, 104b, . . . , 104n, among respective active clients 104a, 104b, . . . , 104n who are currently requesting more bandwidth allocation.

For example, each of the micro-schedulers 102a, 102b, . . . , 102n controls bandwidth allocation for respective virtual machines (VMs) of the respective clients 104a, 104b, . . . , 104n, each of the respective clients 104a, 104b, . . . , 104n subscribing to the respective predefined portion of bandwidth for use by the respective VMs, wherein the respective VMs of the respective clients 104a, 104b, . . . , 104n are hosted on a cloud server, wherein the outgoing communication link 108 includes an outgoing network communication link associated with one or more network interface cards (NICs) located on the cloud server.

For example, each of the micro-schedulers 102a, 102b, . . . , 102n controls bandwidth allocation for respective applications of the respective clients 104a, 104b, . . . , 104n, each of the respective clients 104a, 104b, . . . , 104n subscribing to the respective predefined portion of bandwidth for use by the respective applications, wherein the respective applications of the respective clients 104a, 104b, . . . , 104n are hosted on a cloud server, wherein the outgoing communication link 108 includes an outgoing network communication link associated with one or more network interface cards (NICs) located on the cloud server.

For example, the outgoing communication link 108 includes an outgoing network communication link associated with a network interface card (NIC).

For example, the macro-scheduler 112 controls the plurality of micro-schedulers 102a, 102b, . . . , 102n, providing an approximation of fair queuing, without using a feedback loop between the macro-scheduler 112 and a transmitter.

For example, the macro-scheduler 112 controls the plurality of micro-schedulers 102a, 102b, . . . , 102n, providing no bandwidth allocation controls when it is determined that the outgoing network communication link 108 is not congested.

For example, the macro-scheduler 112 controls the plurality of micro-schedulers 102a, 102b, . . . , 102n, providing an approximation of fair bandwidth allocation to the respective clients 104a, 104b, . . . , 104n, assigning respective independent queues to the respective clients 104a, 104b, . . . , 104n.

For example, a virtual switch may include a plurality of respective virtual ports, wherein a portion of the virtual ports communicate with the clients 104a, 104b, . . . , 104n, and at least one of the virtual ports communicates with the outgoing communication link 108.

For example, the respective virtual ports that respectively communicate with the plurality of respective clients 104a, 104b, . . . , 104n each communicate with a respective token bucket queue that controls respective transmission rates of outgoing packets for each respective client 104a, 104b, . . . , 104n.

For example, a "token bucket" technique may be based on an analogy of a fixed capacity bucket into which tokens (e.g., representing a unit of bytes or a single packet of predetermined size) may be added at a fixed rate. When a packet is to be checked for conformance to predetermined limits, the bucket may be inspected to determine whether it has sufficient tokens at that time. If so, the appropriate number of tokens (e.g., equivalent to the length of the packet in bytes) are removed ("cashed in"), and the packet is passed, e.g., for transmission. The packet does not conform if there are insufficient tokens in the bucket, and the contents of the bucket are not changed. Non-conformant packets can be treated in various ways, for example, they may be dropped, or they may be enqueued for subsequent transmission when sufficient tokens have accumulated in the bucket, or they may be transmitted, but marked as being non-conformant, possibly to be dropped subsequently if the network is overloaded.

Figure 1B:
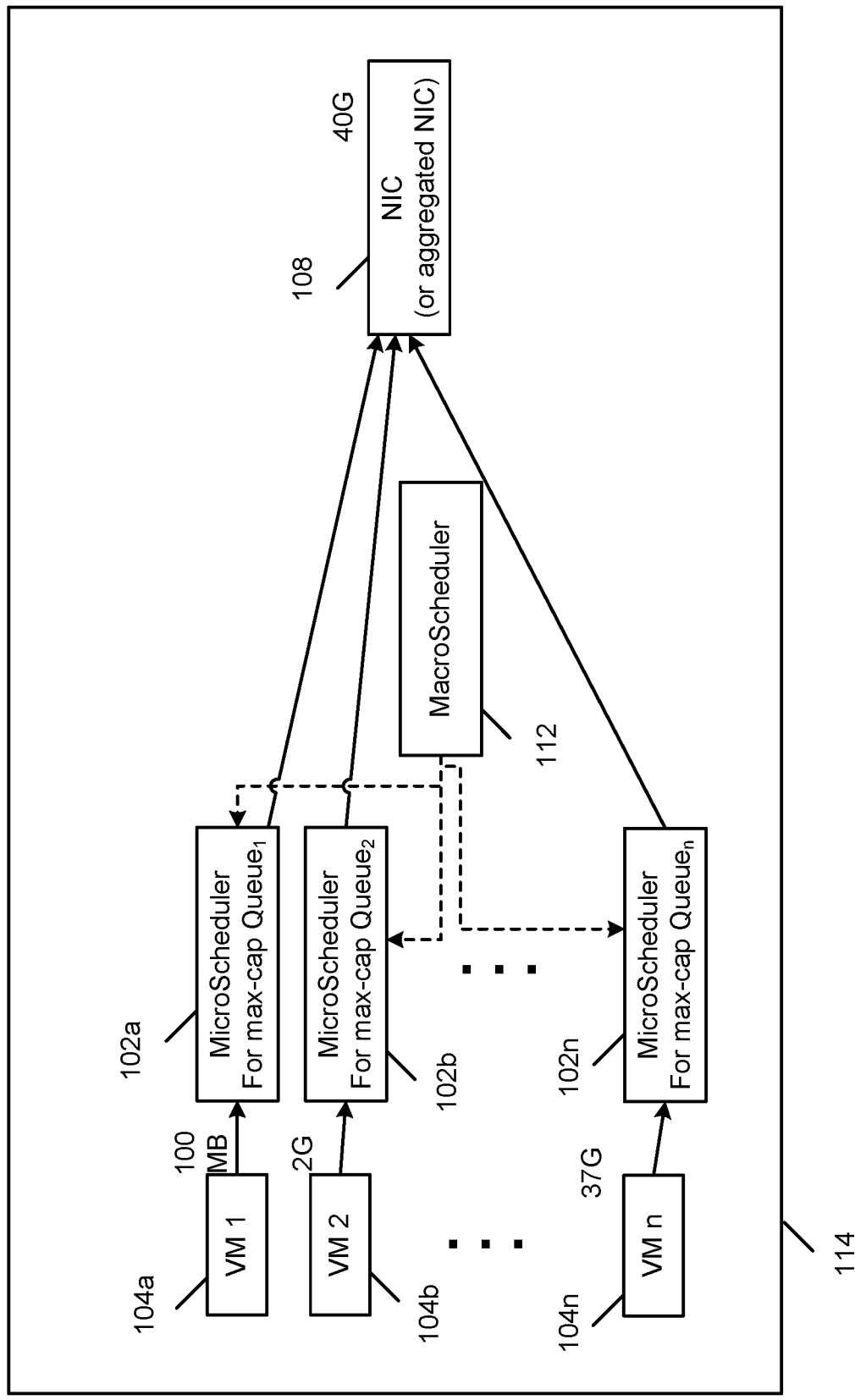
FIG. 1B is a block diagram of an example system for controlling fair bandwidth allocation, in accordance with example techniques discussed herein.

FIG. 1B is a block diagram of an example system for controlling fair bandwidth allocation, in accordance with example techniques discussed herein.

As shown in FIG. 1B, NIC (or aggregated NIC) 108 on server 114 has 40 GB, a fixed amount of bandwidth (BW) available for outgoing communications from resources on server 114. As shown in FIG. 1B, a VM 1 (104a) is subscribed (entitled) to 100 MB (e.g., a client may subscribe, and pay a service provider for 100 MB/month of outgoing bandwidth on the server 114—for example, the client may pay $100/mo for 100 MB of outgoing bandwidth on the server 114). As shown in FIG. 1B, a VM 2 (104b) is subscribed (entitled) to 2 GB (e.g., a client may subscribe, and pay a service provider for 2 GB/month of outgoing bandwidth on the server 114—for example, the client may pay $2,000/mo for 2 GB of outgoing bandwidth on the server 114). Similarly, a VM n (104n) is subscribed (entitled) to 37 GB (e.g., a client may subscribe, and pay a service provider for 37 GB/month of outgoing bandwidth on the server 114). Thus, the NIC (or aggregated NIC) 108 has sufficient bandwidth to support the subscribed bandwidth of the server's clients 104a, . . . , 104n. Further, the clients may all expect that they will each be able to get their subscribed outgoing bandwidth if they all become active and send outgoing information to the NIC 108 (i.e., each client will be able to get what they pay for). Example techniques discussed herein may control allocation of bandwidth so that all active subscribed clients will eventually receive (i.e., be allocated) the amount of outgoing bandwidth they subscribe to (and pay for). Further, example techniques discussed herein may control allocation of bandwidth so that residual bandwidth (left over after active clients have received their requested bandwidth, up to their subscribed amount) is allocated so that it is not unused (and wasted). Further, example techniques discussed herein may control allocation of bandwidth so that residual bandwidth (left over after active clients have received their requested bandwidth, up to their subscribed amount) is allocated proportionately to each active client's subscribed/entitled amount of bandwidth. Thus, clients are unable to conspire to obtain more bandwidth (e.g., the clients are treated as being untrusted).

For example, the VMs 104a, . . . , 104n may be hosted on a single machine 114, and a host partition may include an operating system (OS) of the machine 114 to host the VMs 104a, . . . , 104n, and may include a virtual switch (software) that acts like a switch with virtual ports to which the VMs 104a, . . . , 104n are attached. The virtual switch includes functionality to ensure that the sum of the BW allocated across all the VMs 104a, . . . , 104n is less than (or equal to) the output sum, and that the bandwidth is distributed among them proportionately to the respective VM subscribed bandwidths.

In an example bandwidth problem space (e.g., using hardware), hardware queues for each port have the packets for sending, and in software, there are layers so that it is possible to determine when packet has been sent. However, multiple threads pull packets out of queues, so that it is difficult to determine whether the packets are in correct order. For these types of scenarios, it may not be practical to implement hardware schedulers in software.

Figure 2:
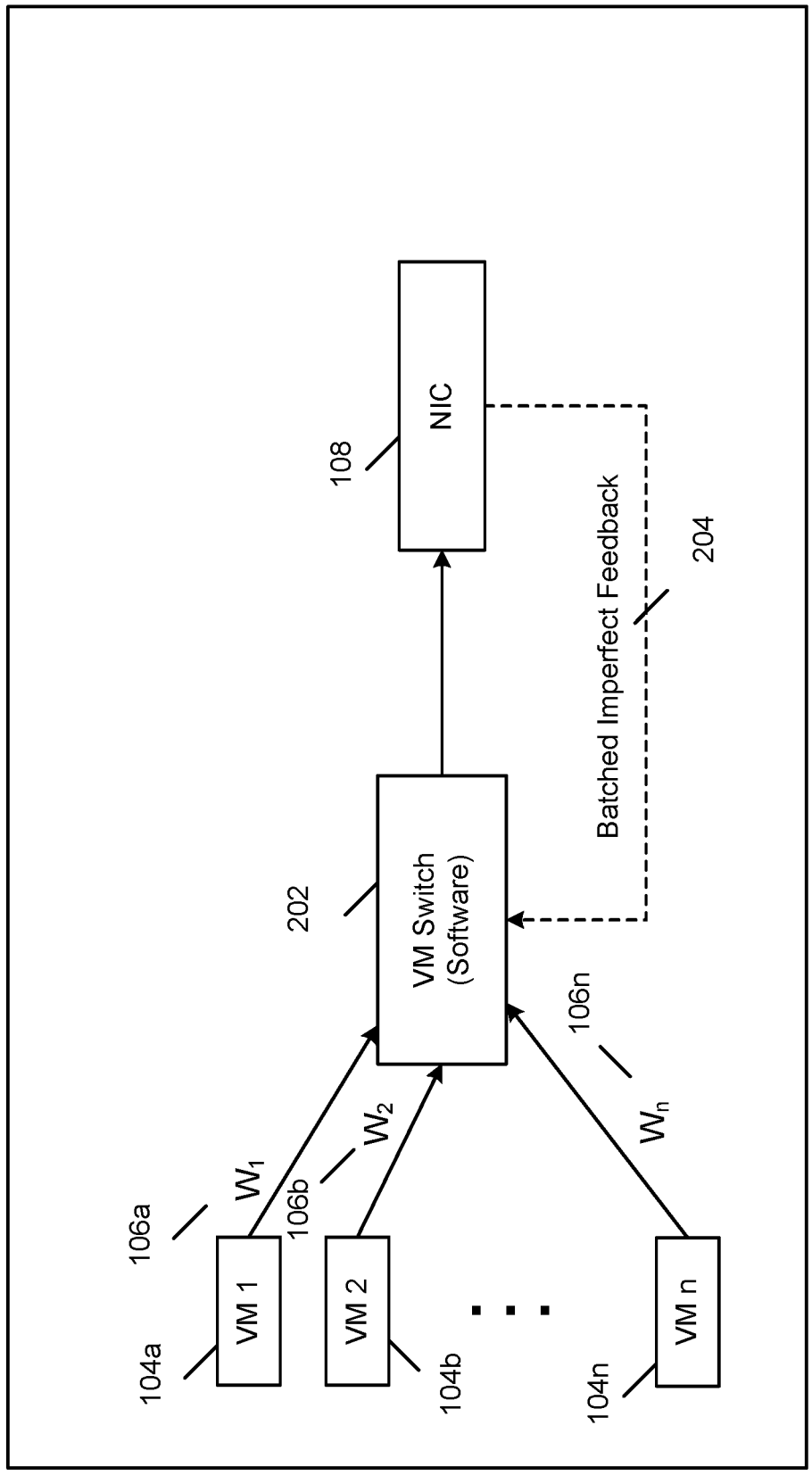
FIG. 2 is a block diagram of an example system involving VM fair bandwidth allocation using a VM switch.
Figure 3:
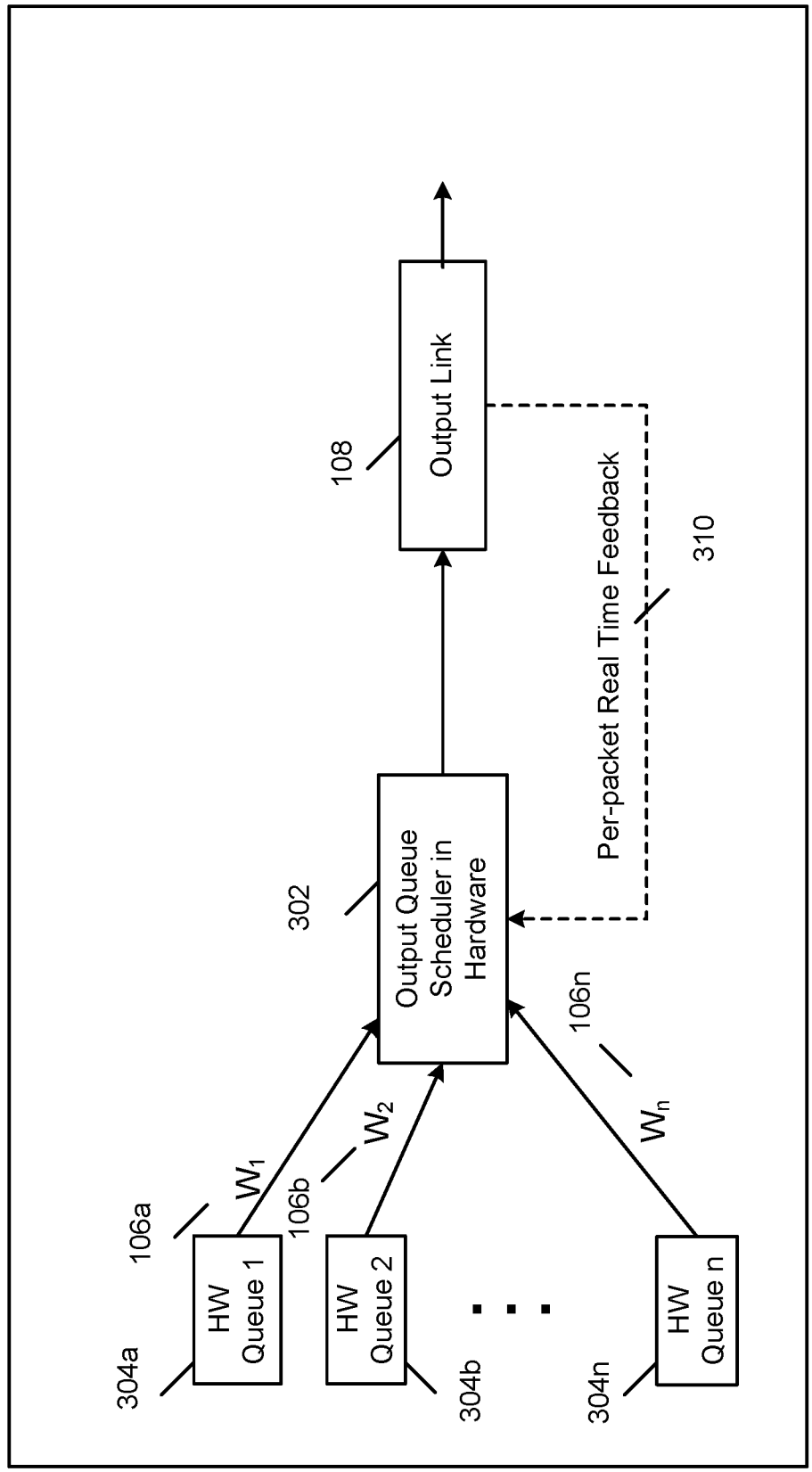
FIG. 3 is a block diagram of an example system involving hardware fair bandwidth allocation in routers, using an output queue scheduler in hardware.

FIG. 2 is a block diagram of an example system involving VM fair bandwidth allocation using a VM switch 202 and batched (imperfect) feedback 204, from the NIC 108 to the WM switch 202 (implemented in software for this example). As illustrated in FIG. 2, it may be desired, given input bandwidths $IB_i$ for all VMs 104a, 104b, . . . , 104n, to calculate allocated bandwidths $AB_i$ to provide:
  a) Congestion Freedom: The sum of allocated bandwidths $AB_i$ does not exceed NIC or link bandwidth B
  b) Strong Fair Allocation: Divide B among active VMs 104a, 104b, . . . , 104n in proportion to their weights $W_i$ 106a, 106b, . . . , 106n (that are a proxy to their subscription amount)
  c) Weak Fair Allocation: If $IB_i < B*W_i$/sum of weights, then $OB_i = IB_i$. Otherwise, $OB_i >= B*W_i$/sum of weights FIG. 3 is a block diagram of an example system involving hardware fair bandwidth allocation in routers, using an output queue scheduler 302 in hardware, with per-packet real time feedback 310 from the output link 108 to the hardware output queue scheduler 302. As illustrated in FIG. 3, it may be desired, given input bandwidths $IB_i$ for all VMs (with hardware queues 304a, 304b, . . . , 304n for this example), to calculate allocated bandwidths $AB_i$ to provide:
  a) Congestion Freedom: Not explicitly specified as the scheduler only operates when packet is transmitted, so no congestion or queues
  b) Strong Fair Allocation: Divide B among active VMs in proportion to their weights $W_i$ 106a, 106b, . . . , 106n (that are a proxy to their subscription amount)

Many conventional techniques may be used for this example system, for example, deficit round robin (DRR), start-time fair queuing, etc.

However, if the clients 104 of FIG. 1A are VMs, DRR may not be desirable for VM bandwidth allocation (using software instead of hardware). For example, feedback from a NIC may be unreliable, as it may be batched (i.e., not real-time feedback), thus providing imperfect feedback.

For example, it may be too expensive to include fine grain timers in software at microsecond granularity to perform the scheduling. For example, it may be infeasible/too expensive to include a real time scheduler, as a user may not be able to afford a VM switch scheduler to be invoked on every packet. Further, a single core may not transmit as fast as the NIC. As shown in FIG. 1A, it may be desirable for every VM to transmit independently to the NIC with only loose synchronization at predetermined temporal intervals (e.g., 10 msec intervals) via the VM switch.

Example implications of such an example system may include:
  a) No scheduler in real-time path: the VM scheduler can set parameters rarely (e.g., every 10 msec)
  b) A scheduler estimates demand ($IB_i$) for each VM based on past periods (measurement based)
  c) A scheduler adjusts allocation for each VM in the next period to converge to fair allocations
  d) Imperfect Feedback: It may be ensured that the NIC does not overflow (e.g., use NIC buffering in short run)
  e) Make Sum of VM allocations<=NIC Bandwidths Discussed below (and as shown in greater detail in FIGS. 4A-4I), are more detailed example operations for efficiently controlling bandwidth allocations, in accordance with example techniques discussed herein. CurrentInt is set to a value indicating a current temporal interval. The discussion below assumes a NIC and independent queues for each client (e.g., VM) that is subscribed to the NOC's outgoing bandwidth. The discussion below also assumes a QoS technique that monitors QoS for the system. The discussion below further assumes that values expressed in explicit numbers are not static, and thus, may be configurable to different values for various different implementations. For example, "90% of effective capacity" may be configured to another value. For example, numbers of iterations, and all values expressed as percentages may be configurable to different numbers. For example, timing values (e.g., 100 ma) may also be configurable to different values.

If the NIC is not in congestion mode, do nothing (no queue has a cap). The NIC is not in congestion mode if it has not crossed 90% of effective capacity, or if it has been below 80% of effective capacity for 120 s.

When the QoS first transitions into congestion mode, assign each queue a max cap of the queue's min guarantee.

When QoS is in congestion mode, all queues have a max cap, and the sum of the max caps is less than or equal to the NIC's effective capacity Periodically (e.g., every 100 ms):
  a) If queue is below 85% of the current allocated rate (AR) for 10 consecutive iterations, set queue's rate=110% of current send rate
  b) If queue is above 95% of current allocated rate in the last iteration:
    i) If 1 iteration of consecutive congestion: target allocated rate=min(allocated rate*120%, AR+10% NIC rate)

ii) If 2 iterations of consecutive congestion: target allocated rate=min(allocated rate*150%, AR+10% NIC rate)

iii) If 3 iterations of consecutive congestion: target allocated rate=max(allocated rate*2, Min guarantee)

Set new allocated rate=min(Target allocated rate, Min guarantee).

For a queue with new allocated rate=Min guarantee, distribute the residual bandwidth according to fair share up to target allocated rate.

As more general explanation, if the NIC is not congested, nothing is done to further control bandwidth allocations. If the NIC is congested, a max-cap queue is assigned to each VM. As discussed above, each max-cap queue is managed by a micro-scheduler, independently of other micro-schedulers. As discussed above, these queues are actively adjusted every temporal interval (e.g., every 100 ms) to balance between bandwidth requirements and fair bandwidth allocations (i.e., amount of bandwidth each VM wants/requests vs. amount of bandwidth each VM is entitled/subscribed to receive).

If a VM has sent below its allocated rate in the last temporal interval (e.g., 100 ms), its max-cap value is reduced.

The residual bandwidth (bandwidth left over from VMs that do not use all their min guarantees) is used to distribute to VMs that want to send more: if a VM has sent substantially close to its allocated rate in the last 100 ms, its max-cap queue is increased proportional to its fair bandwidth allocation.

One skilled in the art of computing will appreciate that there may be many ways to efficiently control the bandwidth allocation discussed herein, without departing from the spirit of the discussion herein.

In this context, a "processor" may include a single processor or multiple processors configured to process instructions associated with a computing system. A processor may thus include one or more processors executing instructions in parallel and/or in a distributed manner. For example, the system 100A may include one or more processors (e.g., hardware processors). For example, the system 100A may include at least one tangible computer-readable storage medium storing instructions executable by the one or more processors, the executable instructions configured to cause at least one computing apparatus to perform operations associated with various example components included in the system 100A, as discussed herein. For example, the one or more processors may be included in the at least one computing apparatus. One skilled in the art of computing will understand that there are many configurations of processors and computing apparatuses that may be configured in accordance with the discussion herein, without departing from the spirit of such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

According to an example embodiment, the system 100A may manage network communication between the system 100A and other entities that may communicate with the system 100A via at least one network. For example, the network may include at least one of the Internet, at least one wireless network, or at least one wired network. For example, the network may include a cellular network, a radio network, or any type of network that may support transmission of data for the system 100A.

FIGS. 4A-4F illustrate example instructions for an example implementation of example operations of the system of FIG. 1.

Figure 4A:
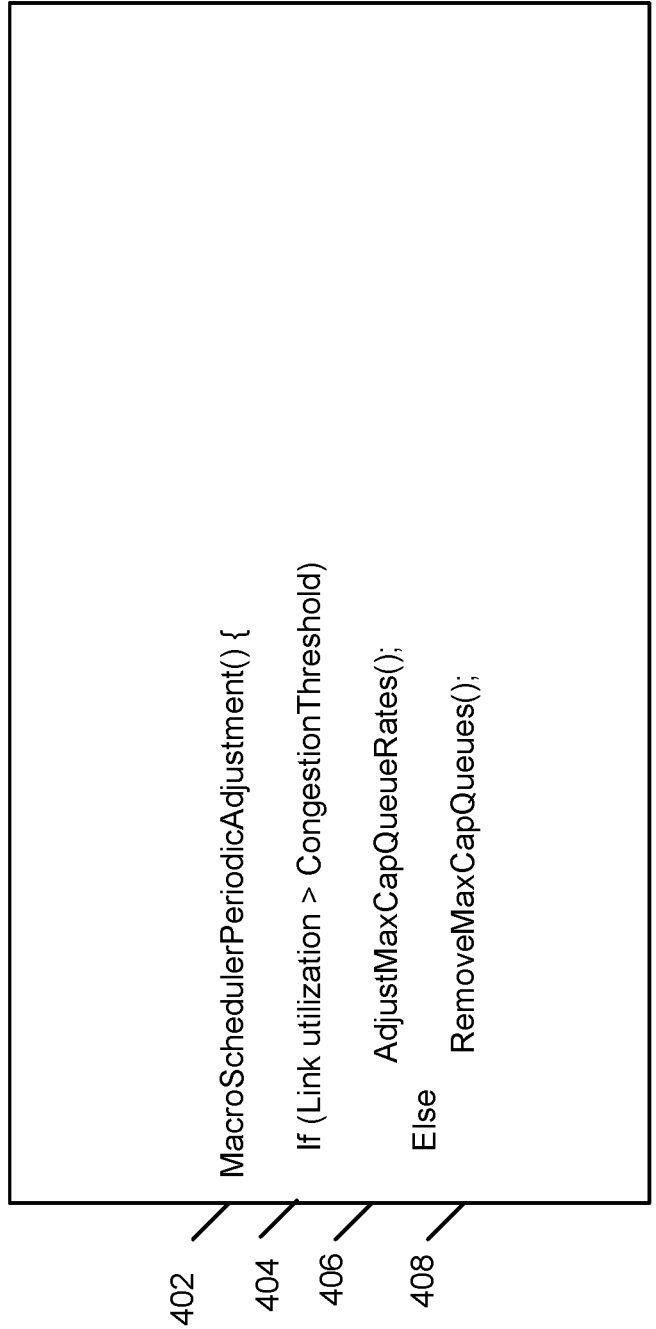

As shown in FIG. 4A, a macroscheduler (e.g., macro-scheduler 112) makes periodic adjustments (402) to bandwidth allocations. At 404, it is determined whether the line is currently in congestion control mode. If so, the macro-scheduler adjusts the max-cap queues (406). Otherwise, the macro-scheduler removes max-cap queues (408) since there is no congestion to manage (i.e., each VM can satisfy its min guarantee without having to put a max-cap queue on other VMs).

FIG. 4B illustrates example instructions for adjusting line rates. At 410, residual bandwidth is initialized with all available bandwidth.

FIG. 4C illustrates example instructions for allocating bandwidth to VM's based on their recent transmission rates. At 412, a list of the VM's is traversed to perform operations (e.g., to set caps on the queues). At 414, if a VM did not have a max-cap queue in the last period, the VM's target rate is set to 110% of its current send rate.

At 416, if the VM's send rate is less than 85% of the VM's current allocated rate (i.e., the VM is not using all of its allocated bandwidth), the VM's allocated rate is reduced to 110% of its current send rate. A ramp-up counter (RUStage) is decremented by 1 (until it reaches 0) each time it is determined that a VM is not using all of its allocated bandwidth.

At 418, if the VM's send rate is greater than 95% of the VM's current allocated rate (interpreted as the VM wanting more bandwidth than its current allocation), at 420, the ramp-up counter (RUStage) is increased (e.g., incremented by 1) each time it is determined that a VM wants more bandwidth (within a limiting predetermined, configurable number of iterations).

As shown in FIG. 4D, the higher the value of the ramp-up counter (RUStage), the more bandwidth is given to the VM (with the gradual ramp-up). At 422, a switch is used to determine which phase of ramp-up is current. At 424, for a first phase, the VM is given 20% more bandwidth, but not exceeding 10% if the link's speed.

At 426, for a second phase of ramp-up, the VM is given 50% more bandwidth, but not exceeding 10% if the link's speed. At 428, for a second phase of ramp-up, the VM is given 100% more bandwidth.

At 430, if the VM is neither using too much nor too little of its allocated bandwidth, the VM's computed target rate is set to the VM's allocated rate, and the ramp-up counter is decremented. At 432, if the VM is not transmitting, the VM is assigned a "small" max-cap value as its target rate (e.g., a max of its current target rate and 10 Mbps). For this example, the 10 Mbps is predetermined and configurable.

FIG. 4E illustrates example instructions for distributing remaining bandwidth. As shown in FIG. 4E, a variable "TempRate" is initially set to the computed target rate, but not to exceed the amount of bandwidth to which a VM is entitled (e.g., subscribed). At 434, after setting TempRate to the smaller value of the computed target rate, and the minimum guarantee bandwidth, if TempRate is equal to the minimum guarantee bandwidth, then the computed target rate is above this value. Therefore, the VM is marked with the NeedsMore flag. The "weight" of this VM (e.g., a value proportional to its min guarantee bandwidth) is added to the sum of weights for VMs that need more bandwidth. This sum of weights is later used to determine how to divide the residual bandwidth among VMs that need more bandwidth. At 436, the available residual bandwidth is reduced by the amount allocated to the VM.

FIG. 4F illustrates example instructions for distributing remaining bandwidth. At 438, while residual bandwidth is available (illustrated via a "while loop"), the list of VM max-cap queues is iterated, to provide each VM with a need for more bandwidth, with a fair share of the residual bandwidth, at 440.

At 442, residual bandwidth is harvested from VM's that do not need all of their current target rate. The while loop is repeated until there is no more residual bandwidth to distribute, or when there is no more VM that needs more bandwidth. At 444, the final allocation values are set for the VM max-cap queues (e.g., by the macroscheduler 112).

FIGS. 5A-5I illustrate example bandwidth allocations for an example implementation of example operations of the system of FIG. 1. In the example of FIGS. 5A-5I, a system includes a NIC with 10 Gbps (gigabit per second) NIC output capability, and 4 virtual machines (VMs) with VM1 (104a) having a bandwidth allocation of 1 Gbps, VM2 (104b) having a bandwidth allocation of 2 Gbps, VM3 (104c) having a bandwidth allocation of 3 Gbps, and VM4 (104d) having a bandwidth allocation of 4 Gbps.

As shown in FIGS. 5A-5I, the VMS are illustrated with an actual send rate (SR) (in Gbps) in the last macro-scheduler period, as well as a bandwidth allocation (for the VM's max-cap queue) by the macro-scheduler 112 (shown as "BW alloc" in FIGS. 5A-5I), in accordance with 10 example macro scheduler 112 periods (as discussed above).

Figure 5A:
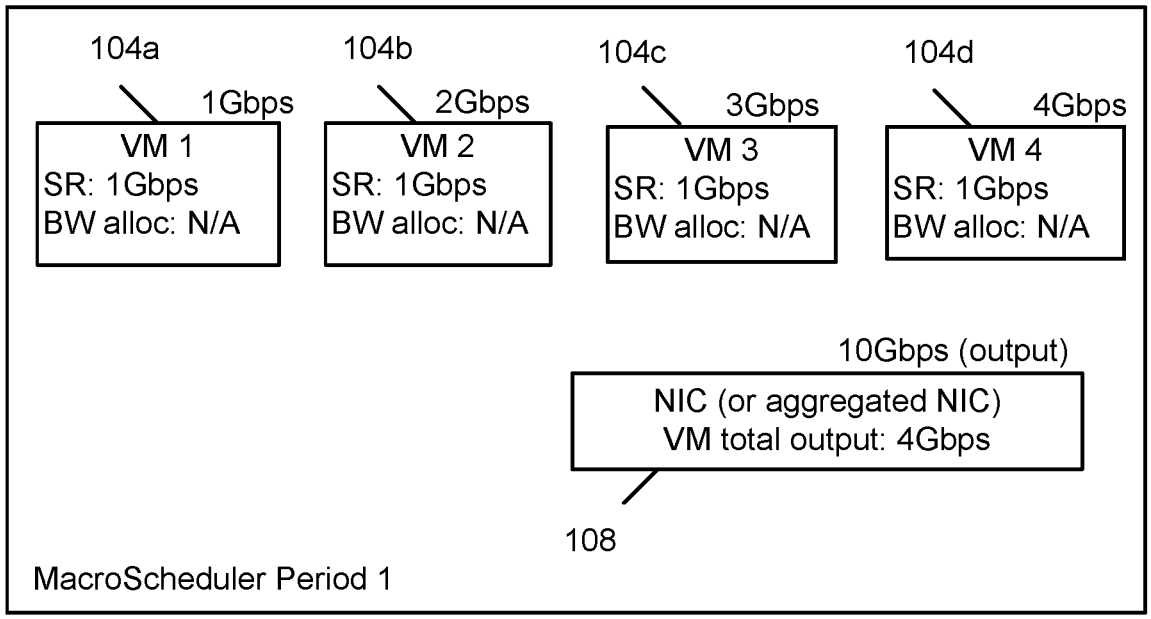
FIGS. 5A-5J illustrate example bandwidth allocations for an example implementation of example operations of the system of FIG. 1.

As shown in FIG. 5A, for the first period of the macro-scheduler 112, the actual send rate (SR) in the last macro-scheduler period was 1 Gbps for each of the four VMs, for a total output of 4 Gbps, and thus there is no bandwidth management because there is no congestion at the NIC 108.

Figure 5B:
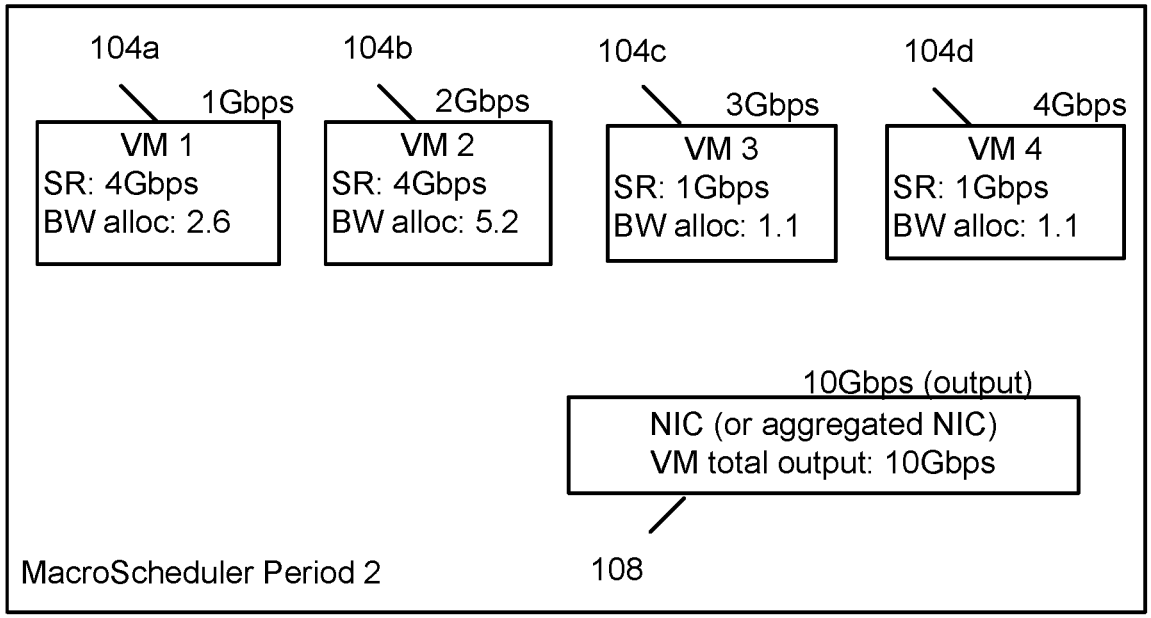

As shown in FIG. 5B, for the second period of the macro-scheduler 112, the actual send rate (SR) in the last macro-scheduler period was 4 Gbps for VM 1 (104a), 4 Gbps for VM 2 (104b), 1 Gbps for VM 3 (104c), and 1 Gbps for VM 4 (104d), for a total output of 10 Gbps. In this period, congestion is detected at the output link (at NIC 108), and the VMs are capped. In this example, VM3 and VM4 are given a max amount higher than their send rates so that it may be detected whether they want more bandwidth. As shown in FIG. 5B, the macro-scheduler 112 allocates bandwidth as 2.6 Gbps for VM 1 (104a), 5.2 Gbps for VM 2 (104b), 1.1 Gbps for VM 3 (104c), and 1.1 Gbps for VM 4 (104d), for a total of 10 Gbps allocated by the macro-scheduler 112 for the current period.

Figure 5C:
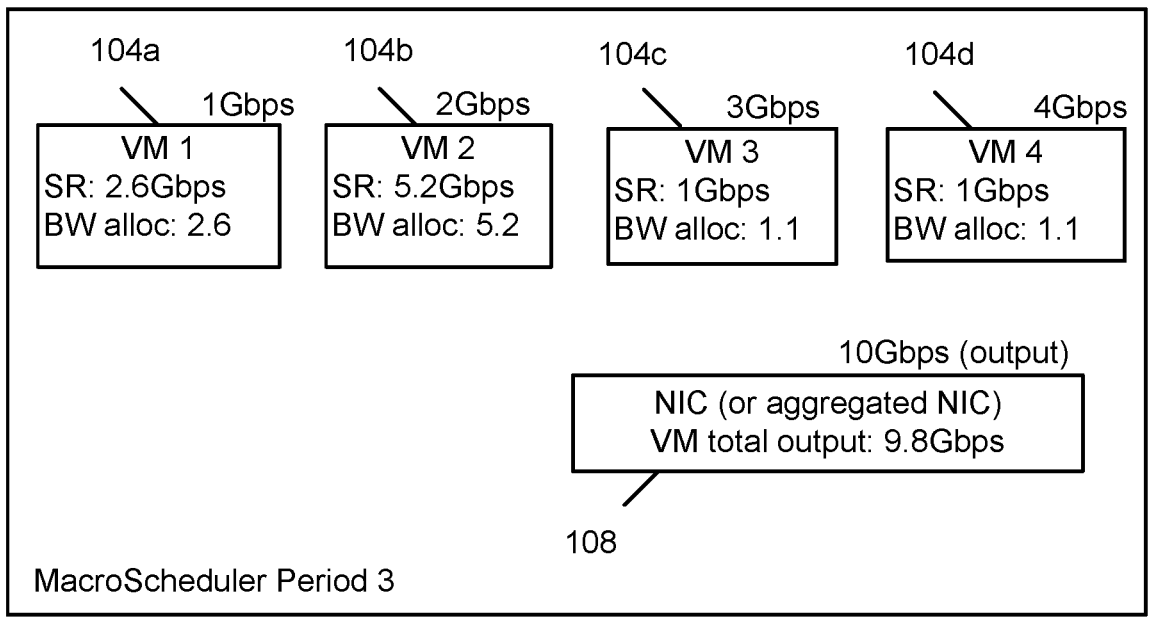

As shown in FIG. 5C, for the third period of the macro-scheduler 112, the actual send rate (SR) in the last macro-scheduler period was 2.6 Gbps for VM 1 (104a), 5.2 Gbps for VM 2 (104b), 1 Gbps for VM 3 (104c), and 1 Gbps for VM 4 (104d), for a total output of 9.8 Gbps. In this period, there is no change in macro-scheduler allocation.

Figure 5D:
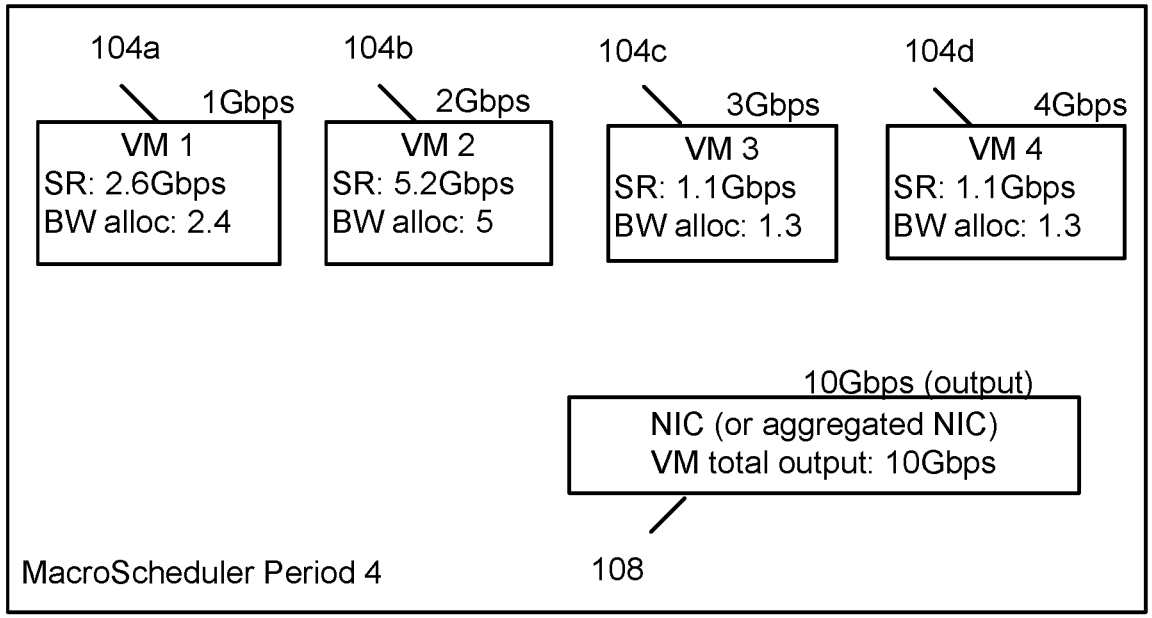

As shown in FIG. 5D, for the fourth period of the macro-scheduler 112, the actual send rate (SR) in the last macro-scheduler period was 2.6 Gbps for VM 1 (104a), 5.2 Gbps for VM 2 (104b), 1.1 Gbps for VM 3 (104c), and 1.1 Gbps for VM 4 (104d), for a total output of 10 Gbps. In this example, it is detected that VM3 and VM4 want more bandwidth. Thus, bandwidth allocations to VM3 and VM4 are increased by 20% in a slow ramp-up fashion, while some bandwidth allocation to VM1 and VM2 is reduced. As shown in FIG. 5D, the macro-scheduler 112 allocates bandwidth as 2.4 Gbps for VM 1 (104a), 5 Gbps for VM 2 (104b), 1.3 Gbps for VM 3 (104c), and 1.3 Gbps for VM 4 (104d), for a total of 10 Gbps allocated by the macro-scheduler 112 for the current period.

Figure 5E:
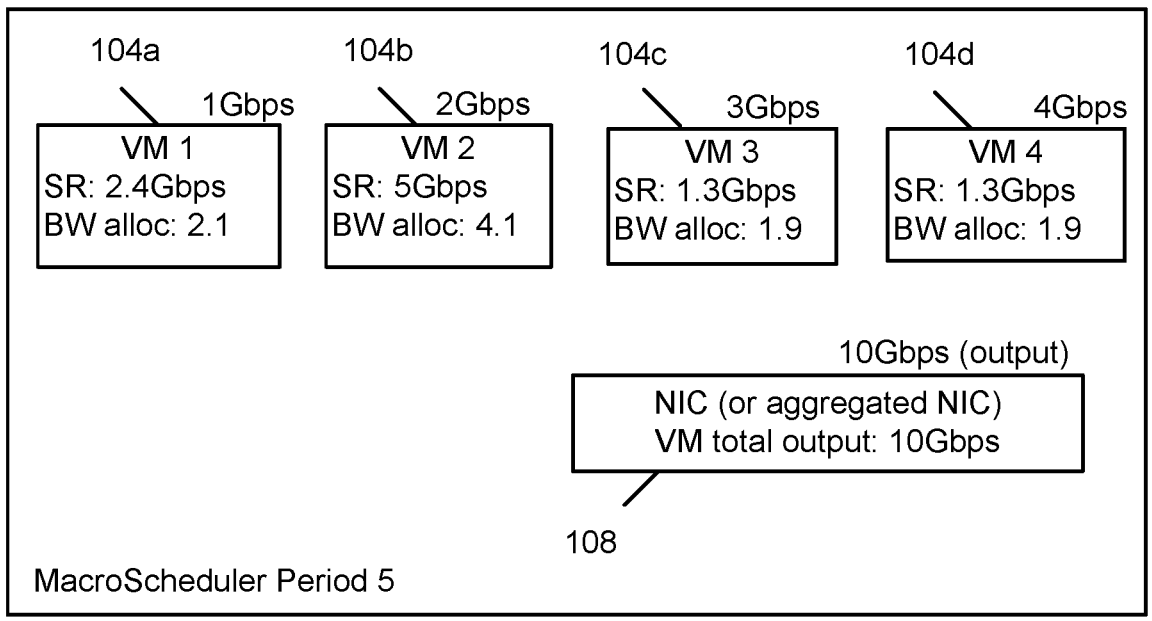

As shown in FIG. 5E, for the fifth period of the macro-scheduler 112, the actual send rate (SR) in the last macro-scheduler period was 2.4 Gbps for VM 1 (104a), 5 Gbps for VM 2 (104b), 1.3 Gbps for VM 3 (104c), and 1.3 Gbps for VM 4 (104d), for a total output of 10 Gbps. In this period, it is detected that VM3 and VM4 want more bandwidth. Thus, bandwidth allocations to VM3 and VM4 are increased by 50% in a slow ramp-up fashion, while some bandwidth allocation to VM1 and VM2 is reduced. As shown in FIG. 5E, the macro-scheduler 112 allocates bandwidth as 2.1 Gbps for VM 1 (104a), 4.1 Gbps for VM 2 (104b), 1.9 Gbps for VM 3 (104c), and 1.9 Gbps for VM 4 (104d), for a total of 10 Gbps allocated by the macro-scheduler 112 for the current period.

Figure 5F:
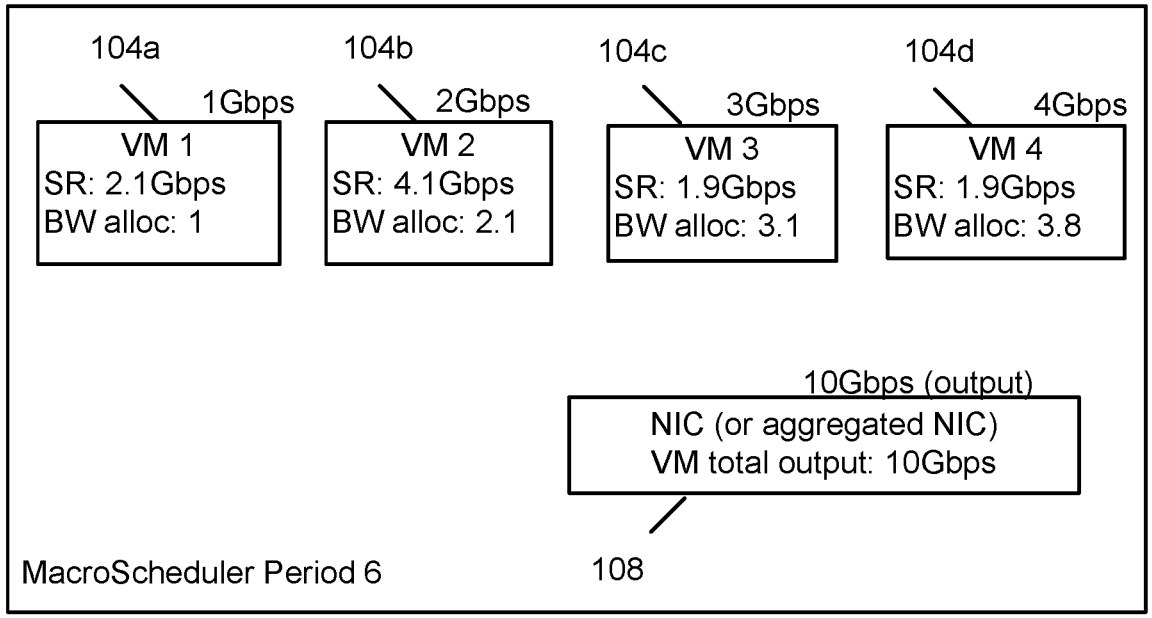

As shown in FIG. 5F, for the sixth period of the macro-scheduler 112, the actual send rate (SR) in the last macro-scheduler period was 2.1 Gbps for VM 1 (104a), 4.1 Gbps for VM 2 (104b), 1.9 Gbps for VM 3 (104c), and 1.9 Gbps for VM 4 (104d), for a total output of 10 Gbps. In this period, it is detected that VM3 and VM4 want more bandwidth. Thus, bandwidth allocations to VM3 and VM4 are increased by 100% in a slow ramp-up fashion, while some bandwidth allocation to VM1 and VM2 is reduced. In this example, the macro-scheduler 112 only allocates bandwidth to VM3 up to its minimum guarantee plus any residual bandwidth that is unused by VM4. As shown in FIG. 5F, the macro-scheduler 112 allocates bandwidth as 1 Gbps for VM 1 (104a), 2.1 Gbps for VM 2 (104b), 3.1 Gbps for VM 3 (104c), and 3.8 Gbps for VM 4 (104d), for a total of 10 Gbps allocated by the macro-scheduler 112 for the current period.

Figure 5G:
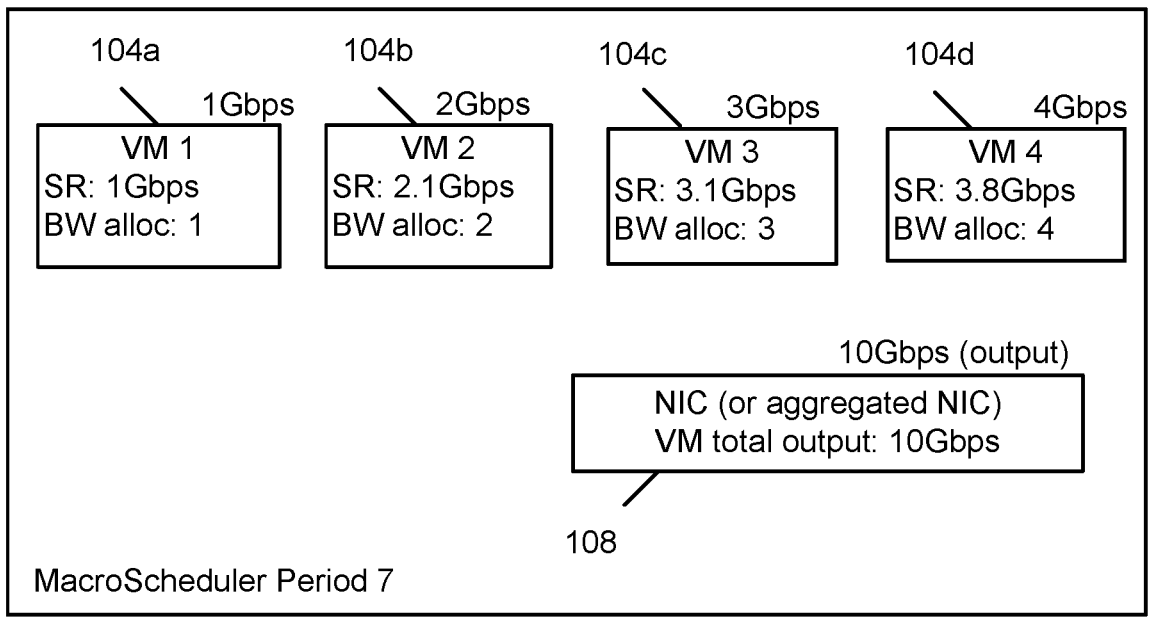

As shown in FIG. 5G, for the seventh period of the macro-scheduler 112, the actual send rate (SR) in the last macro-scheduler period was 1 Gbps for VM 1 (104a), 2.1 Gbps for VM 2 (104b), 3.1 Gbps for VM 3 (104c), and 3.8 Gbps for VM 4 (104d), for a total output of 10 Gbps. In this period, it is detected that VM4 wants more bandwidth. Thus, bandwidth allocation to VM4 is increased to its minimum guarantee. As shown in FIG. 5G, the macro-scheduler 112 allocates bandwidth as 1 Gbps for VM 1 (104a), 2 Gbps for VM 2 (104b), 3 Gbps for VM 3 (104c), and 4 Gbps for VM 4 (104d), for a total of 10 Gbps allocated by the macro-scheduler 112 for the current period.

Figure 5H:
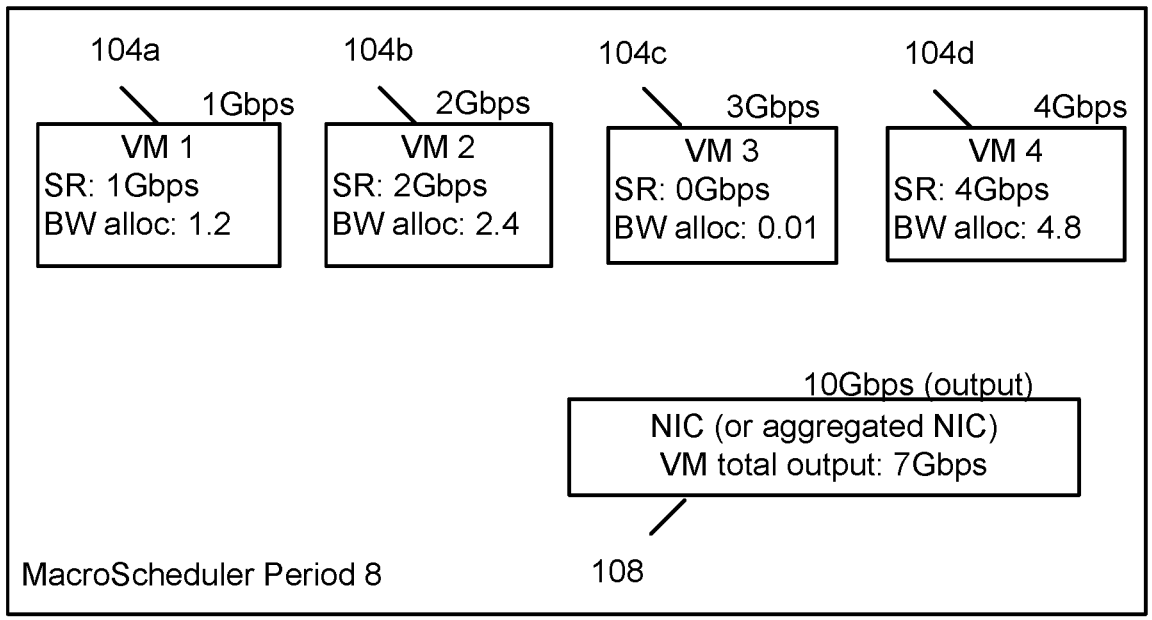

As shown in FIG. 5H, for the eighth period of the macro-scheduler 112, the actual send rate (SR) in the last macro-scheduler period was 1 Gbps for VM 1 (104a), 2 Gbps for VM 2 (104b), 0 Gbps for VM 3 (104c), and 4 Gbps for VM 4 (104d), for a total output of 7 Gbps. In this period, it is detected that VM3 has ceased transmitting. Thus, residual bandwidth is allocated to VM1, VM2, and VM4 in a ramp-up fashion, while VM3 is provided with a close-to-zero max-cap queue. As shown in FIG. 5H, the macro-scheduler 112 allocates bandwidth as 1.2 Gbps for VM 1 (104a), 2.4 Gbps for VM 2 (104b), 0.01 Gbps for VM 3 (104c), and 4.8 Gbps for VM 4 (104d), for the current period.

Figure 5I:
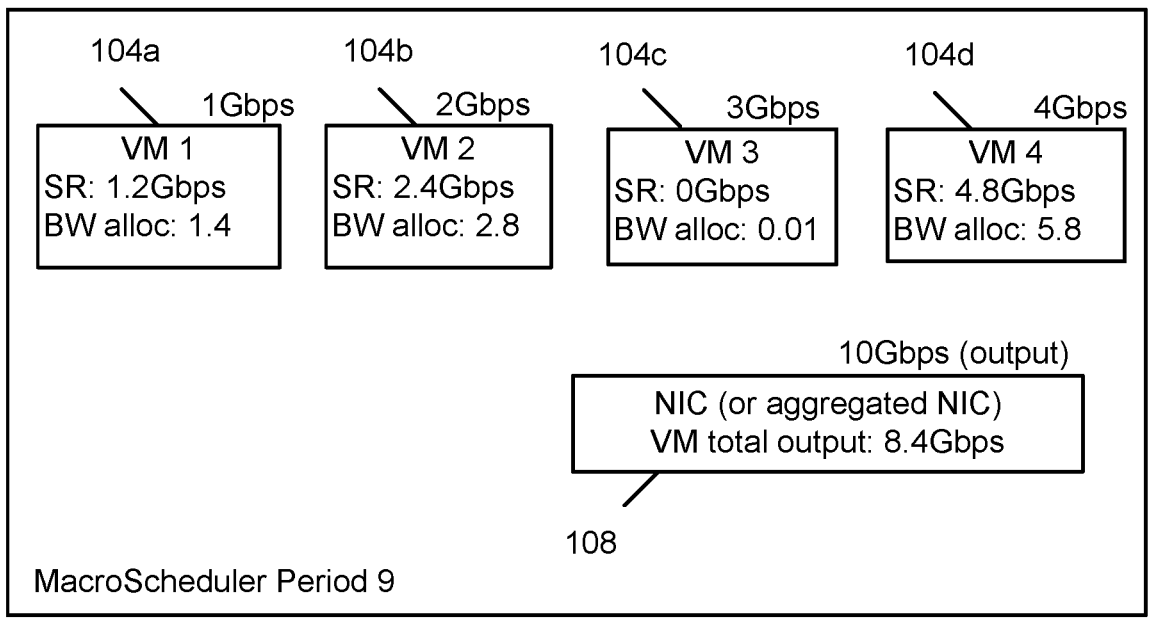

As shown in FIG. 5I, for the ninth period of the macro-scheduler 112, the actual send rate (SR) in the last macro-scheduler period was 1.2 Gbps for VM 1 (104a), 2.4 Gbps for VM 2 (104*b*), 0 Gbps for VM 3 (104*c*), and 4.8 Gbps for VM 4 (104*d*), for a total output of 8.4 Gbps. In this period, more residual bandwidth is distributed proportionally up to 10 Gbps total. As shown in FIG. 5H, the macro-scheduler 112 allocates bandwidth as 1.4 Gbps for VM 1 (104*a*), 2.8 Gbps for VM 2 (104*b*), 0.01 Gbps for VM 3 (104*c*), and 5.8 Gbps for VM 4 (104*d*), for the current period.

Figure 5J:
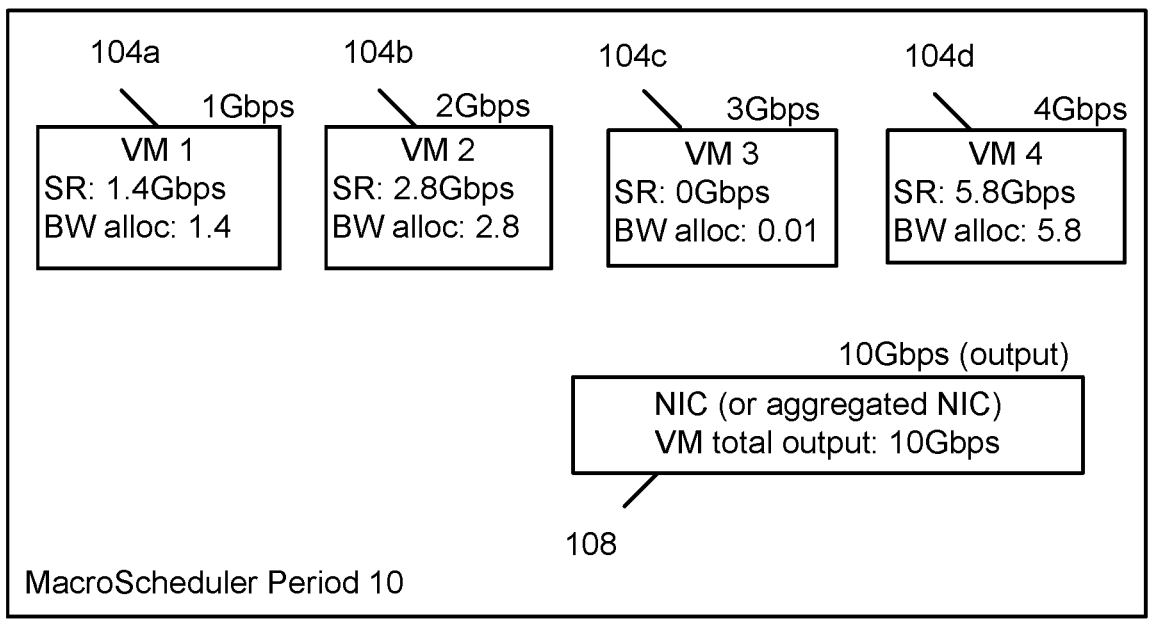

As shown in FIG. 5J, for the tenth period of the macro-scheduler 112, the actual send rate (SR) in the last macro-scheduler period was 1.4 Gbps for VM 1 (104*a*), 2.8 Gbps for VM 2 (104*b*), 0 Gbps for VM 3 (104*c*), and 5.8 Gbps for VM 4 (104*d*), for a total output of 10 Gbps, the maximum capacity of the NIC 108.

One skilled in the art of computing will appreciate that many different techniques may be used for efficiently controlling bandwidth allocation, without departing from the spirit of the discussion herein.

II. Flowchart Description

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

Figure 6A:
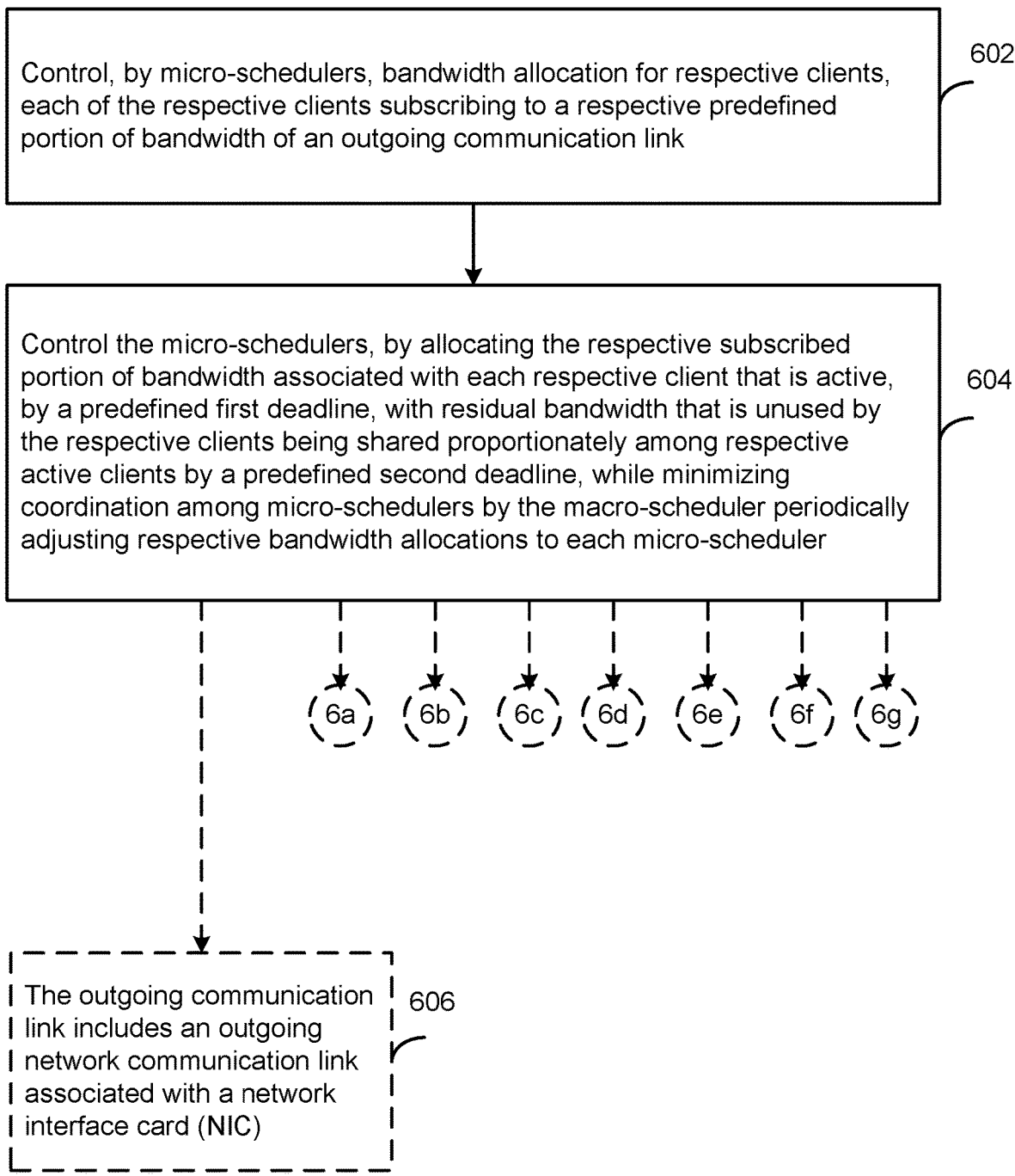

FIGS. 6A-6D are a flowchart illustrating example operations of the system of FIG. 1, according to example embodiments. In the example of FIG. 6A, micro-schedulers control bandwidth allocation for respective clients, each of the respective clients subscribing to a respective predefined portion of bandwidth of an outgoing communication link (602).

The micro-schedulers are controlled, by allocating the respective subscribed portion of bandwidth associated with each respective client that is active, by a predefined first deadline, with residual bandwidth that is unused by the respective clients being shared proportionately among respective active clients by a predefined second deadline, while minimizing coordination among micro-schedulers by the macro-scheduler periodically adjusting respective bandwidth allocations to each micro-scheduler (604).

For example, the outgoing communication link includes an outgoing network communication link associated with a network interface card (NIC) (606).

Figure 6B:
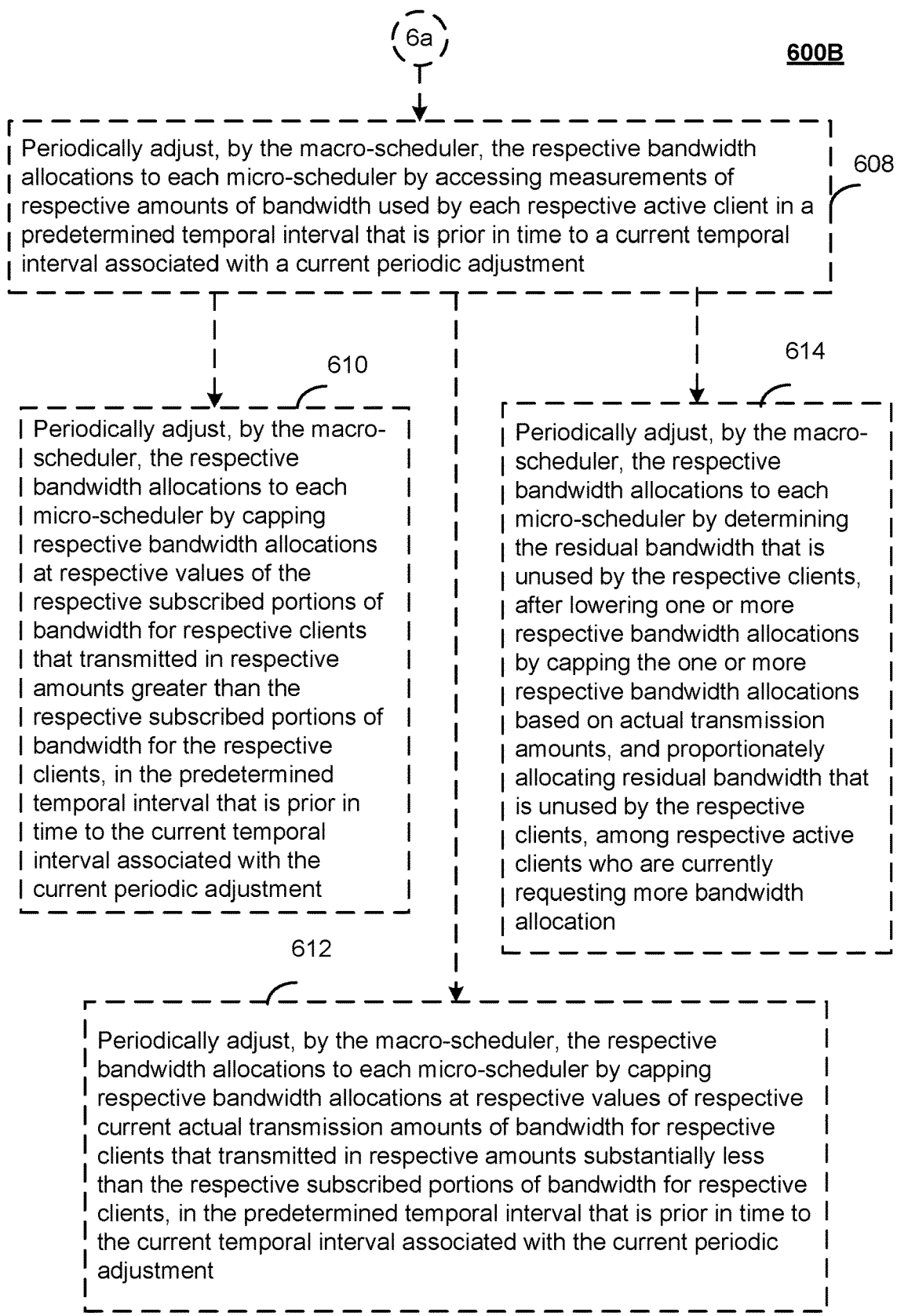

For example, the macro-scheduler periodically adjusts the respective bandwidth allocations to each micro-scheduler by accessing measurements of respective amounts of bandwidth used by each respective active client in a predetermined temporal interval that is prior in time to a current temporal interval associated with a current periodic adjustment (608), in the example of FIG. 6B.

For example, the macro-scheduler periodically adjusts the respective bandwidth allocations to each micro-scheduler by capping respective bandwidth allocations at respective values of the respective subscribed portions of bandwidth for respective clients that transmitted in respective amounts greater than the respective subscribed portions of bandwidth for the respective clients, in the predetermined temporal interval that is prior in time to the current temporal interval associated with the current periodic adjustment (610).

For example, the macro-scheduler periodically adjusts the respective bandwidth allocations to each micro-scheduler by capping respective bandwidth allocations at respective values of respective current actual transmission amounts of bandwidth for respective clients that transmitted in respective amounts substantially less than the respective subscribed portions of bandwidth for respective clients, in the predetermined temporal interval that is prior in time to the current temporal interval associated with the current periodic adjustment (612).

For example, the macro-scheduler periodically adjusts the respective bandwidth allocations to each micro-scheduler by determining the residual bandwidth that is unused by the respective clients, after lowering one or more respective bandwidth allocations by capping the one or more respective bandwidth allocations based on actual transmission amounts, and proportionately allocating residual bandwidth that is unused by the respective clients, among respective active clients who are currently requesting more bandwidth allocation (614).

For example, each of the micro-schedulers controls bandwidth allocation for respective virtual machines (VMs) of the respective clients, each of the respective clients subscribing to the respective predefined portion of bandwidth for use by the respective VMs, wherein the respective VMs of the respective clients are hosted on a cloud server, wherein the outgoing communication link includes an outgoing network communication link associated with one or more network interface cards (NICs) located on the cloud server (616), in the example of FIG. 6C.

For example, each of the micro-schedulers controls bandwidth allocation for respective applications of the respective clients, each of the respective clients subscribing to the respective predefined portion of bandwidth for use by the respective applications, wherein the respective applications of the respective clients are hosted on a cloud server, wherein the outgoing communication link includes an outgoing network communication link associated with one or more network interface cards (NICs) located on the cloud server (618).

For example, the macro-scheduler controls the plurality of micro-schedulers, providing an approximation of fair queuing, without using a feedback loop between the macro-scheduler and a transmitter (620).

For example, the macro-scheduler controls the plurality of micro-schedulers, providing no bandwidth allocation controls when it is determined that the outgoing network communication link is not congested (622).

Figure 6D:
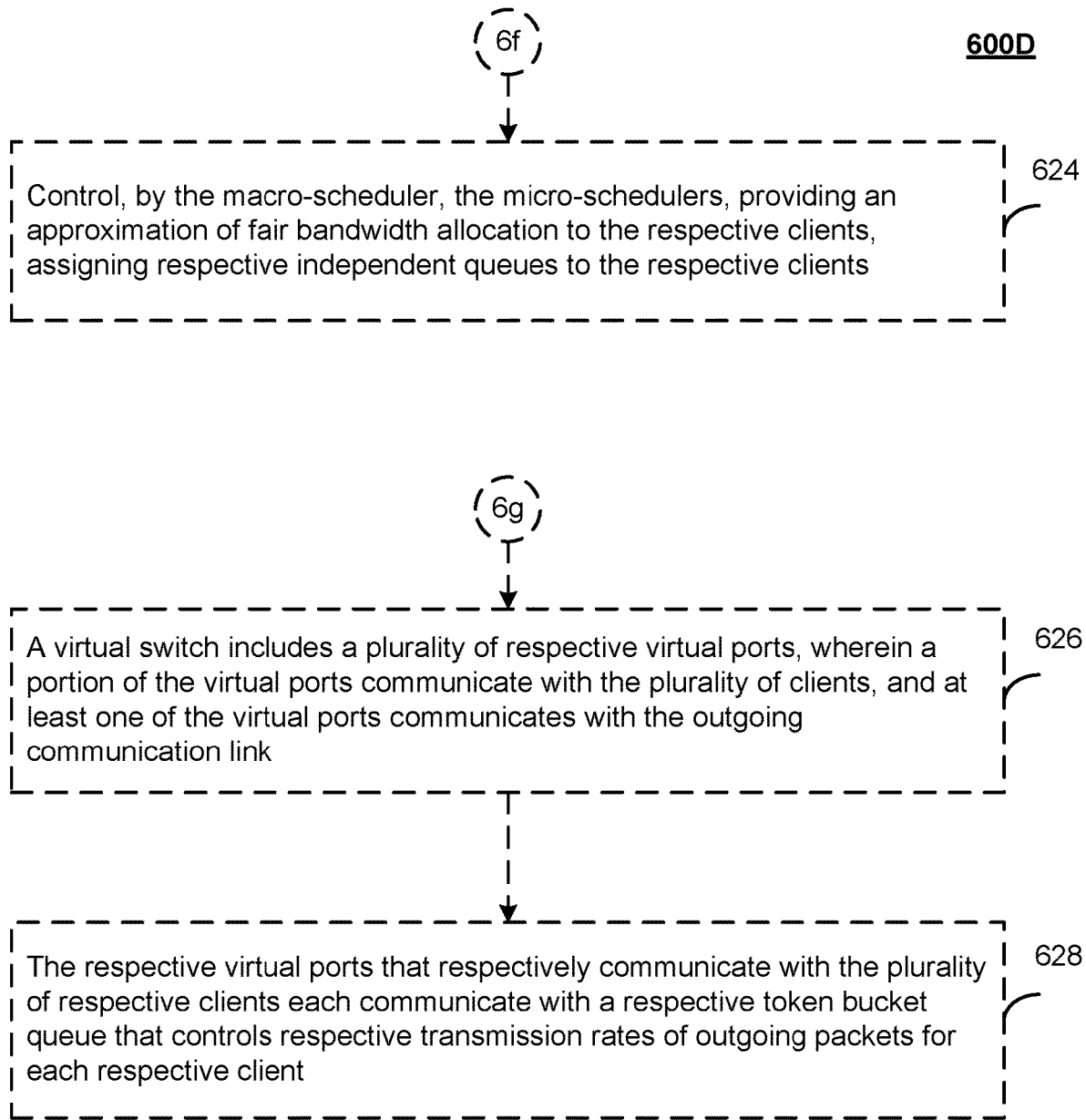

For example, the macro-scheduler controls the plurality of micro-schedulers, providing an approximation of fair bandwidth allocation to the respective clients, assigning respective independent queues to the respective clients (624), in the example of FIG. 6D.

For example, a virtual switch includes a plurality of respective virtual ports, wherein a portion of the virtual ports communicate with the plurality of clients, and at least one of the virtual ports communicates with the outgoing communication link (626).

For example, the respective virtual ports that respectively communicate with the plurality of respective clients each communicate with a respective token bucket queue that controls respective transmission rates of outgoing packets for each respective client (628).

Figure 7A:
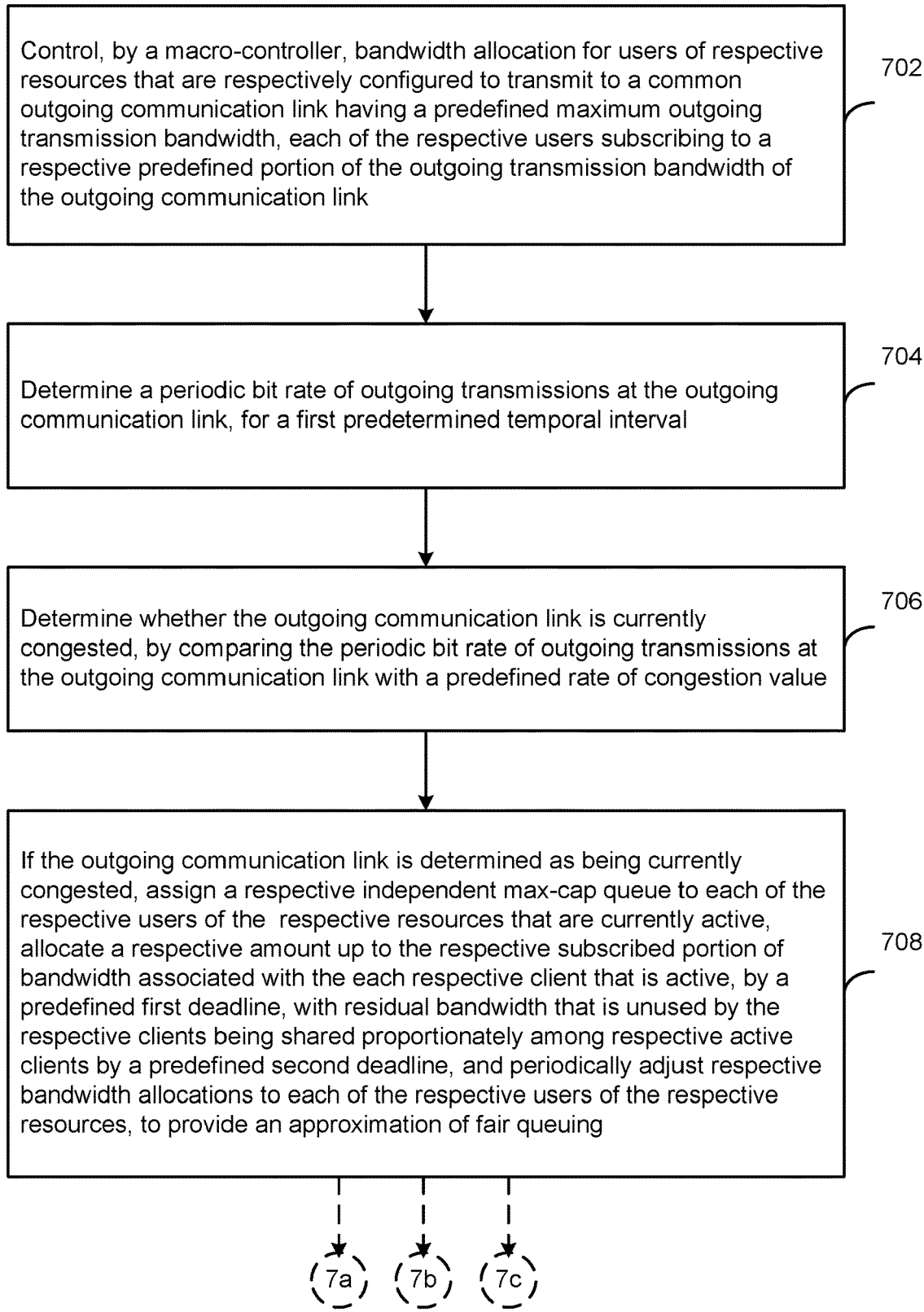
FIGS. 7A-7B are a flowchart illustrating example operations of the system of FIG. 1.
Figure 7B:
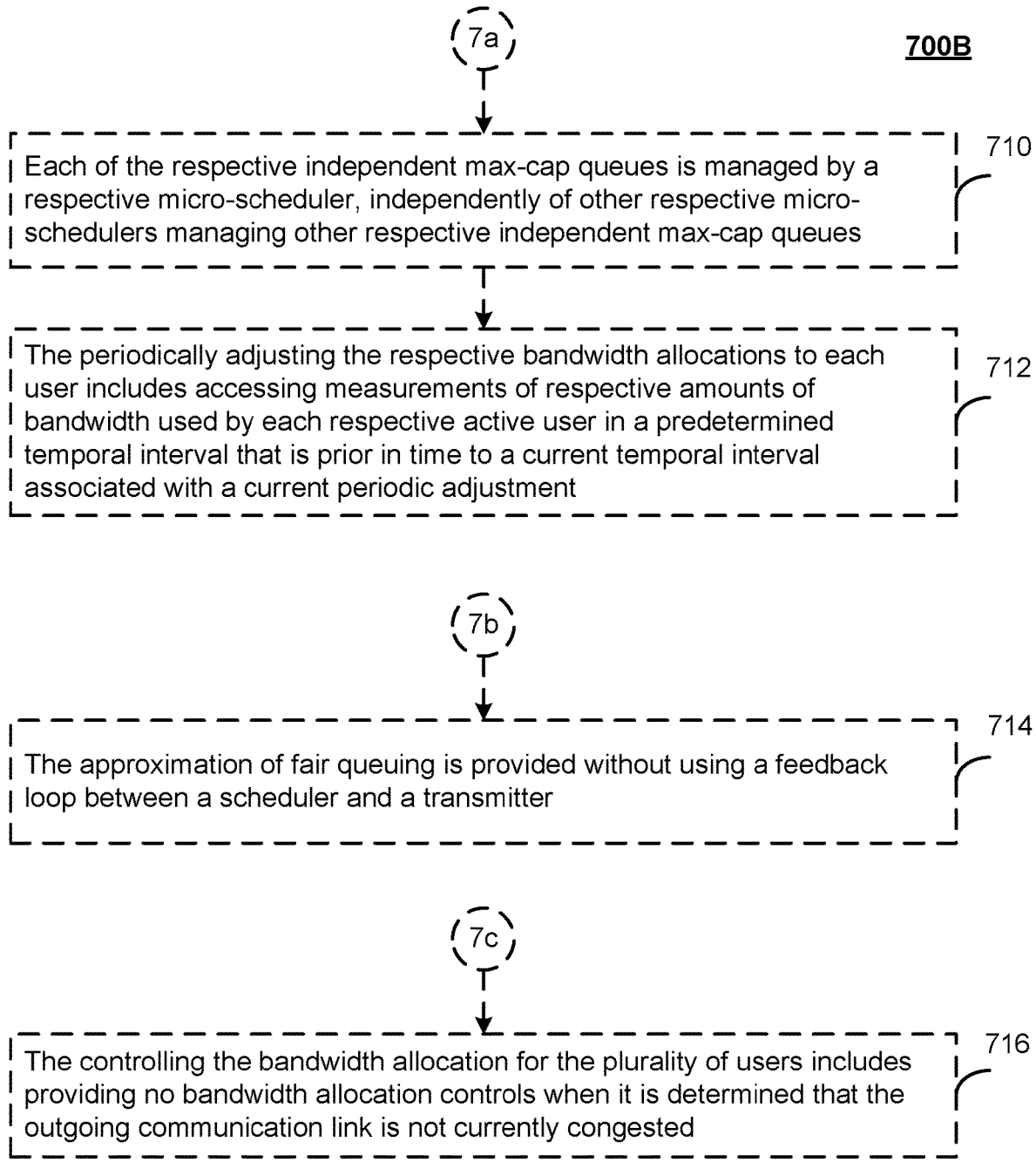

FIGS. 7A-7B are a flowchart illustrating example operations of the system of FIG. 1, according to example embodiments. In the example of FIG. 7A, bandwidth allocation is controlled, by a macro-controller, for users of respective resources that are respectively configured to transmit to a common outgoing communication link having a predefined maximum outgoing transmission bandwidth, each of the respective users subscribing to a respective predefined portion of the outgoing transmission bandwidth of the outgoing communication link (702).

A periodic bit rate of outgoing transmissions at the outgoing communication link is determined, for a first predetermined temporal interval (704).

It is determined whether the outgoing communication link is currently congested, by comparing the periodic bit rate of outgoing transmissions at the outgoing communication link with a predefined rate of congestion value (706).

If the outgoing communication link is determined as being currently congested, a respective independent max-cap queue is assigned to each of the respective users of the respective resources that are currently active, a respective amount is allocated, up to the respective subscribed portion of bandwidth associated with the each respective client that is active, by a predefined first deadline, with residual bandwidth that is unused by the respective clients being shared proportionately among respective active clients by a predefined second deadline, and respective bandwidth allocations to each of the respective users of the respective resources are periodically adjusted, to provide an approximation of fair queuing (708).

For example, each of the respective independent max-cap queues is managed by a respective micro-scheduler, independently of other respective micro-schedulers managing other respective independent max-cap queues (710), in the example of FIG. 7B.

For example, the periodically adjusting the respective bandwidth allocations to each user includes accessing measurements of respective amounts of bandwidth used by each respective active user in a predetermined temporal interval that is prior in time to a current temporal interval associated with a current periodic adjustment (712).

For example, the approximation of fair queuing is provided without using a feedback loop between a scheduler and a transmitter (714).

For example, the controlling the bandwidth allocation for the plurality of users includes providing no bandwidth allocation controls when it is determined that the outgoing communication link is not currently congested (716).

Figure 8:
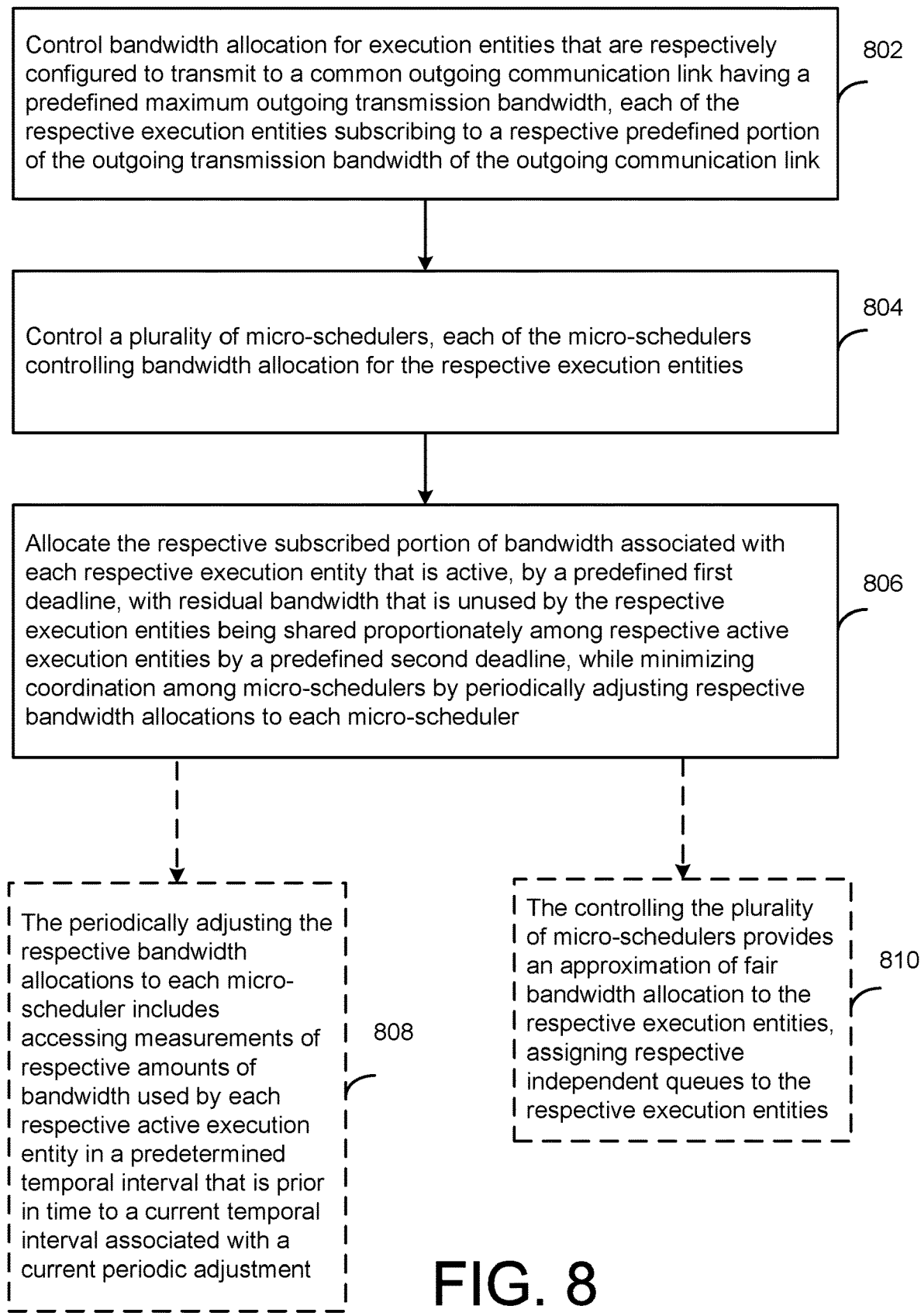
FIG. 8 is a flowchart illustrating example operations of the system of FIG. 1.

FIG. 8 is a flowchart illustrating example operations of the system of FIG. 1, according to example embodiments. In the example of FIG. 8, bandwidth allocation is controlled for execution entities that are respectively configured to transmit to a common outgoing communication link having a predefined maximum outgoing transmission bandwidth, each of the respective execution entities subscribing to a respective predefined portion of the outgoing transmission bandwidth of the outgoing communication link (802).

A plurality of micro-schedulers are controlled, each of the micro-schedulers controlling bandwidth allocation for the respective execution entities (804).

The respective subscribed portion of bandwidth associated with each respective execution entity that is active, is allocated by a predefined first deadline, with residual bandwidth that is unused by the respective execution entities being shared proportionately among respective active execution entities by a predefined second deadline, while minimizing coordination among micro-schedulers by periodically adjusting respective bandwidth allocations to each micro-scheduler (806).

For example, the periodically adjusting the respective bandwidth allocations to each micro-scheduler includes accessing measurements of respective amounts of bandwidth used by each respective active execution entity in a predetermined temporal interval that is prior in time to a current temporal interval associated with a current periodic adjustment (808).

For example, the controlling the plurality of micro-schedulers provides an approximation of fair bandwidth allocation to the respective execution entities, assigning respective independent queues to the respective execution entities (810).

III. Aspects of Certain Embodiments

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

For example, a system includes at least one processor, and a computer-readable storage medium that stores executable instructions that are executable by the at least one processor. The executable instructions include a bandwidth allocation controller that includes a plurality of micro-schedulers, each of the micro-schedulers controlling bandwidth allocation for respective clients, each of the respective clients subscribing to a respective predefined portion of bandwidth of an outgoing communication link.

A macro-scheduler controls the plurality of micro-schedulers, by: for each respective client that is active, allocating the respective subscribed portion of bandwidth associated with the each respective client that is active, by a predefined first deadline, with residual bandwidth that is unused by the respective clients being shared proportionately among respective active clients by a predefined second deadline, while minimizing coordination among micro-schedulers by the macro-scheduler periodically adjusting respective bandwidth allocations to each micro-scheduler.

The macro-scheduler periodically adjusts the respective bandwidth allocations to each micro-scheduler by accessing measurements of respective amounts of bandwidth used by each respective active client in a predetermined temporal interval that is prior in time to a current temporal interval associated with a current periodic adjustment.

The macro-scheduler periodically adjusts the respective bandwidth allocations to each micro-scheduler by capping respective bandwidth allocations at respective values of the respective subscribed portions of bandwidth for respective clients that transmitted in respective amounts greater than the respective subscribed portions of bandwidth for the respective clients, in the predetermined temporal interval that is prior in time to the current temporal interval associated with the current periodic adjustment.

The macro-scheduler periodically adjusts the respective bandwidth allocations to each micro-scheduler by capping respective bandwidth allocations at respective values of respective current actual transmission amounts of bandwidth for respective clients that transmitted in respective amounts substantially less than the respective subscribed portions of bandwidth for respective clients, in the predetermined temporal interval that is prior in time to the current temporal interval associated with the current periodic adjustment.

The macro-scheduler periodically adjusts the respective bandwidth allocations to each micro-scheduler by determining the residual bandwidth that is unused by the respective clients, after lowering one or more respective bandwidth allocations by capping the one or more respective bandwidth allocations based on actual transmission amounts, and proportionately allocating residual bandwidth that is unused by the respective clients, among respective active clients who are currently requesting more bandwidth allocation.

Each of the micro-schedulers controls bandwidth allocation for respective virtual machines (VMs) of the respective clients, each of the respective clients subscribing to the respective predefined portion of bandwidth for use by the respective VMs, wherein the respective VMs of the respective clients are hosted on a cloud server, wherein the outgoing communication link includes an outgoing network communication link associated with one or more network interface cards (NICs) located on the cloud server.

Each of the micro-schedulers controls bandwidth allocation for respective applications of the respective clients, each of the respective clients subscribing to the respective predefined portion of bandwidth for use by the respective applications, wherein the respective applications of the respective clients are hosted on a cloud server, wherein the outgoing communication link includes an outgoing network communication link associated with one or more network interface cards (NICs) located on the cloud server.

The outgoing communication link includes an outgoing network communication link associated with a network interface card (NIC).

The macro-scheduler controls the plurality of micro-schedulers, providing an approximation of fair queuing, without using a feedback loop between the macro-scheduler and a transmitter.

The macro-scheduler controls the plurality of micro-schedulers, providing no bandwidth allocation controls when it is determined that the outgoing network communication link is not congested.

The macro-scheduler controls the plurality of micro-schedulers, providing an approximation of fair bandwidth allocation to the respective clients, assigning respective independent queues to the respective clients.

A virtual switch that includes a plurality of respective virtual ports, wherein a portion of the virtual ports communicate with the plurality of clients, and at least one of the virtual ports communicates with the outgoing communication link.

The respective virtual ports that respectively communicate with the plurality of respective clients each communicate with a respective token bucket queue that controls respective transmission rates of outgoing packets for each respective client.

A method includes controlling, by a macro-controller, bandwidth allocation for a plurality of users of a plurality of respective resources that are respectively configured to transmit to a common outgoing communication link having a predefined maximum outgoing transmission bandwidth, each of the respective users subscribing to a respective predefined portion of the outgoing transmission bandwidth of the outgoing communication link.

Controlling the bandwidth allocation includes determining a periodic bit rate of outgoing transmissions at the outgoing communication link, for a first predetermined temporal interval, and determining whether the outgoing communication link is currently congested, by comparing the periodic bit rate of outgoing transmissions at the outgoing communication link with a predefined rate of congestion value.

If the outgoing communication link is determined as being currently congested, assigning a respective independent max-cap queue is assigned to each of the plurality of respective users of the plurality of respective resources that are currently active. A respective amount is allocated up to the respective subscribed portion of bandwidth associated with the each respective client that is active, by a predefined first deadline, with residual bandwidth that is unused by the respective clients being shared proportionately among respective active clients by a predefined second deadline.

Respective bandwidth allocations to each of the plurality of respective users of the plurality of respective resources are periodically adjusted, to provide an approximation of fair queuing.

Each of the respective independent max-cap queues is managed by a respective micro-scheduler, independently of other respective micro-schedulers managing other respective independent max-cap queues, and The periodically adjusting the respective bandwidth allocations to each user includes accessing measurements of respective amounts of bandwidth used by each respective active user in a predetermined temporal interval that is prior in time to a current temporal interval associated with a current periodic adjustment.

The approximation of fair queuing is provided without using a feedback loop between a scheduler and a transmitter.

The controlling the bandwidth allocation for the plurality of users includes providing no bandwidth allocation controls when it is determined that the outgoing communication link is not currently congested.

A computer program product includes a computer-readable storage medium storing executable instructions that cause at least one computing device to control bandwidth allocation for a plurality of execution entities that are respectively configured to transmit to a common outgoing communication link having a predefined maximum outgoing transmission bandwidth, each of the respective execution entities subscribing to a respective predefined portion of the outgoing transmission bandwidth of the outgoing communication link.

Controlling the bandwidth allocation includes controlling a plurality of micro-schedulers, each of the micro-schedulers controlling bandwidth allocation for the respective execution entities.

Controlling the plurality of micro-schedulers includes, for each respective execution entity that is active, allocating the respective subscribed portion of bandwidth associated with the each respective execution entity that is active, by a predefined first deadline, with residual bandwidth that is unused by the respective execution entities being shared proportionately among respective active execution entities by a predefined second deadline, while minimizing coordination among micro-schedulers by periodically adjusting respective bandwidth allocations to each micro-scheduler.

The periodically adjusting the respective bandwidth allocations to each micro-scheduler includes accessing measurements of respective amounts of bandwidth used by each respective active execution entity in a predetermined temporal interval that is prior in time to a current temporal interval associated with a current periodic adjustment.

The controlling the plurality of micro-schedulers provides an approximation of fair bandwidth allocation to the respective execution entities, assigning respective independent queues to the respective execution entities.

One skilled in the art of computing will understand that there may be many ways of efficiently controlling bandwidth allocation, without departing from the spirit of the discussion herein.

Customer privacy and confidentiality have been ongoing considerations in computing environments for many years. Thus, example techniques for efficiently controlling bandwidth allocation may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a computing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system, comprising:
at least one processor;
a network interface card configured to provide a bandwidth of an outgoing communication link shared by multiple clients individually subscribing to a predefined portion of the bandwidth; and
a memory operatively coupled to the at least one processor and the network interface card, the memory containing instructions that are executable by the at least one processor to cause the computer system to:
allocate the respective predefined portion of the bandwidth subscribed to each client that is active on transmitting via the outgoing communication link, by a predefined first deadline;
subsequent to an initial period, allocate residual bandwidth of the outgoing communication link that is unused by the respective clients in an amount proportionate among respective clients that are active by a predefined second deadline, wherein the predefined first deadline and the predefined second deadline differ by a time interval of the initial period; and
periodically adjust respective allocation of the bandwidth to each of the clients by repeating the allocating the respectively predefined portion or the allocating the residual bandwidth operations over additional periods subsequent to the initial period.

2. The computer system of claim 1, wherein periodically adjusting includes accessing measurements of respective amounts of bandwidth used by each respective active client in a predetermined temporal interval that is prior in time to a current temporal interval associated with a current periodic adjustment.

3. The computer system of claim 2, wherein:
periodically adjusting includes capping respective bandwidth allocations at respective values of the respective subscribed portions of bandwidth for respective clients that transmitted in respective amounts greater than the respective subscribed portions of bandwidth for the respective clients, in the predetermined temporal interval that is prior in time to the current temporal interval associated with the current periodic adjustment.

4. The computer system of claim 2, wherein:
periodically adjusting includes capping respective bandwidth allocations at respective values of respective current actual transmission amounts of bandwidth for respective clients that transmitted in respective amounts substantially less than the respective subscribed portions of bandwidth for respective clients, in the predetermined temporal interval that is prior in time to the current temporal interval associated with the current periodic adjustment.

5. The computer system of claim 2, wherein:
periodically adjusting includes determining the residual bandwidth that is unused by the respective clients, after lowering one or more respective bandwidth allocations by capping the one or more respective bandwidth allocations based on actual transmission amounts, and proportionately allocating residual bandwidth that is unused by the respective clients, among respective active clients who are currently requesting more bandwidth allocation.

6. The computer system of claim 1, wherein:
the clients individually include a virtual machine (VM) subscribing to the respective predefined portion of bandwidth for use by the VM, wherein the respective VMs of the respective clients are hosted on the computer system.

7. The computer system of claim 1, wherein:
the clients individually include an application subscribing to the respective predefined portion of bandwidth for use by the application, wherein the respective applications are hosted on the computer system.

8. The computer system of claim 1, wherein:
the outgoing communication link includes an outgoing network communication link associated with the network interface card (NIC).

9. The computer system of claim 1, wherein to periodically adjusting respective allocation of the bandwidth includes:
to control bandwidth allocation of the outgoing communication link for providing an approximation of fair queuing without using a feedback loop.

10. The computer system of claim 1, wherein the memory contains additional instructions executable by the processor to cause the computer system to:
provide no bandwidth allocation controls over the outgoing communication link when the outgoing network communication link is determined to be not congested.

11. The computer system of claim 1, wherein to periodically adjusting respective allocation of the bandwidth includes:
to provide an approximation of fair bandwidth allocation to the respective clients by assigning respective independent queues to the respective clients.

12. The computer system of claim 1, further comprising:
a virtual switch that includes a plurality of respective virtual ports, wherein a portion of the virtual ports are configured to communicate with the plurality of clients, and at least one of the virtual ports is configured to communicate with the outgoing communication link.

13. The computer system of claim 12, wherein:
the respective virtual ports that respectively communicate with the plurality of respective clients are each configured to communicate with a respective token bucket queue that controls respective transmission rates of outgoing packets for each respective client.

14. A method of controlling bandwidth allocation for a plurality of clients sharing a common outgoing communication link at a server, the clients individually subscribing to a predefined portion of the outgoing transmission bandwidth, the method comprising:
determining whether the outgoing communication link is currently congested based on a comparison of a periodic total bit rate of outgoing transmissions at the outgoing communication link and a predefined threshold; and
in response to determining that the outgoing communication link is currently congested:
allocating a respective amount of outgoing transmission bandwidth up to the respective predefined portion that each active client is subscribed to, by a predefined first deadline;
subsequent to an initial period, allocating residual bandwidth that is unused by the clients proportionately among active clients by a predefined second deadline, wherein the predefined first deadline and the predefined second deadline differ by a time interval of the initial period; and
periodically repeating the allocating the respective amount and allocating the residual bandwidth operations over additional periods subsequent to the initial period to provide an at least approximation of fair queuing for the clients.

15. The method of claim 14, wherein:
the periodically repeating includes accessing measurements of respective amounts of bandwidth used by each active client in a predetermined temporal interval that is prior in time to a current temporal interval associated with a current periodic adjustment.

16. The method of claim 14, wherein:
the approximation of fair queuing is provided without using a feedback loop.

17. The method of claim 14, further comprising:
providing no bandwidth allocation controls to the plurality of clients in response to determining that the outgoing communication link is not currently congested.

18. A method of controlling bandwidth allocation for a plurality of clients sharing a common outgoing communication link at a server, the clients individually subscribing to a predefined portion of the outgoing transmission bandwidth, the method comprising:
allocating an amount of the outgoing transmission bandwidth up to the respective predefined portion that the clients are individually subscribed to;
allowing the clients to transmit data of the clients via the common outgoing communication link according to the allocated amount of the outgoing transmission bandwidth over an initial period;
subsequent to the initial period, allocating residual bandwidth that is unused by the clients proportionately among clients that are actively transmitting data via the common outgoing communication link; and
periodically adjusting respective bandwidth allocations to the individual clients by repeating the allocating the respectively amount, transmitting, and allocating the residual bandwidth operations over additional periods subsequent to the initial period, thereby providing an at least approximation of fair queuing.

19. The method of claim 18, wherein periodically adjusting respective bandwidth allocations includes:
at a beginning of an additional period, increasing a bandwidth allocation to one of the clients to an amount less than a corresponding predefined portion of the client; and
after the additional period,
determining whether a bit rate of outgoing transmission of the client has increased over the first subsequent period; and
in response to determining that the bit rate of outgoing transmission of the client has increased over the additional period, increasing the bandwidth allocation to the client to another amount less than the corresponding predefined portion of the client.

20. The method of claim 18, wherein periodically adjusting respective bandwidth allocations includes:
at an end of an additional period,
detecting that one of the clients has stopped transmitting during the additional period; and
in response to detecting that the client has stopped transmitting during the additional period, allocating an amount of bandwidth used by the client during a period prior to the additional period, proportionately among the active clients.

* * * * *